United States Patent
Uzelac et al.

(10) Patent No.: US 9,965,094 B2
(45) Date of Patent: *May 8, 2018

(54) CONTACT GEOMETRY TESTS

(75) Inventors: Aleksandar Uzelac, Seattle, WA (US); David A. Stevens, Sammamish, WA (US); Weidong Zhao, Redmond, WA (US); Takahiro Shigemitsu, Bellevue, WA (US); Briggs A. Willoughby, Newcastle, WA (US); John Graham Pierce, Sammamish, WA (US); Pravin Kumar Santiago, Issaquah, WA (US); Craig S. Ranta, Redmond, WA (US); Timothy Allen Wright, Redmond, WA (US); Jeffrey C. Maier, Kirkland, WA (US); Robert T. Perry, Seatac, WA (US); Stanimir Naskov Kirilov, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 325 days.

This patent is subject to a terminal disclaimer.

(21) Appl. No.: 13/198,036

(22) Filed: Aug. 4, 2011

(65) Prior Publication Data

US 2012/0188176 A1 Jul. 26, 2012

Related U.S. Application Data

(60) Provisional application No. 61/435,672, filed on Jan. 24, 2011.

(51) Int. Cl.
*G06F 3/041* (2006.01)
*G06F 11/22* (2006.01)
*G06F 3/044* (2006.01)

(52) U.S. Cl.
CPC ........... *G06F 3/0418* (2013.01); *G06F 3/044* (2013.01); *G06F 11/2221* (2013.01)

(58) Field of Classification Search
CPC ...... G06F 3/0416; G06F 3/044; G06F 3/0418; G06F 3/016; G06F 11/2221
(Continued)

(56) References Cited

U.S. PATENT DOCUMENTS 4,421,997 A 12/1983 Forys
5,241,693 A 8/1993 Kim et al.
(Continued)

FOREIGN PATENT DOCUMENTS

CN 1242096 1/2000
CN 1761932 4/2006
(Continued)

OTHER PUBLICATIONS

"Capacitive Touch Sensors", Retrieved at <<http://www.fujitsu.com/downloads/MICRO/fme/articles/fujitsu-whitepaper-capacitive-touch-sensors.pdf>>, Jan. 12, 2010, pp. 1-12.
(Continued)

*Primary Examiner* — Abdul-Samad A Adediran

(57) ABSTRACT

Touchscreen testing techniques are described. In one or more implementations, a piece of conductor (e.g., metal) is positioned as proximal to a touchscreen device and the touchscreen device is tested by simulating a touch of a user. This technique may be utilized to perform a variety of different testing of a touchscreen device, such as to test latency and probabilistic latency. Additional techniques are also described including contact geometry testing techniques.

20 Claims, 10 Drawing Sheets

(58) Field of Classification Search
USPC ....... 345/173, 174, 178; 178/18.06; 324/658
See application file for complete search history.

(56) References Cited

U.S. PATENT DOCUMENTS

| | | | |
|---|---|---|---|
| 5,493,294 | A | 2/1996 | Morita |
| 5,825,352 | A | 10/1998 | Bisset et al. |
| 5,856,822 | A | 1/1999 | Du et al. |
| 5,943,043 | A | 8/1999 | Furuhata et al. |
| 5,995,081 | A | 11/1999 | Kato |
| 6,008,636 | A | 12/1999 | Miller et al. |
| 6,091,406 | A | 7/2000 | Kambara et al. |
| 6,218,201 | B1 | 4/2001 | Plangger et al. |
| 6,323,846 | B1 | 11/2001 | Westerman et al. |
| 6,671,406 | B1 | 12/2003 | Anderson |
| 6,741,237 | B1 | 5/2004 | Benard et al. |
| 6,856,259 | B1 | 2/2005 | Sharp |
| 6,977,646 | B1 | 12/2005 | Hauck et al. |
| 7,053,887 | B2 | 5/2006 | Kraus et al. |
| 7,174,649 | B1 | 2/2007 | Harris |
| 7,254,775 | B2 | 8/2007 | Geaghan et al. |
| 7,295,191 | B2 | 11/2007 | Kraus et al. |
| 7,362,313 | B2 | 4/2008 | Geaghan et al. |
| 7,375,454 | B2 | 5/2008 | Takasaki |
| 7,489,303 | B1 | 2/2009 | Pryor |
| 7,580,556 | B2 | 8/2009 | Lee et al. |
| 7,592,999 | B2 | 9/2009 | Rosenberg et al. |
| 7,619,618 | B2 | 11/2009 | Westerman et al. |
| 7,711,450 | B2 | 5/2010 | Im et al. |
| 7,725,014 | B2 | 5/2010 | Lam et al. |
| 7,728,821 | B2 | 6/2010 | Hillis et al. |
| 7,746,325 | B2 | 6/2010 | Roberts |
| 7,797,115 | B2 | 9/2010 | Tasher et al. |
| 7,812,828 | B2 | 10/2010 | Westerman et al. |
| 7,907,750 | B2 | 3/2011 | Ariyur et al. |
| 7,916,127 | B2 | 3/2011 | Wang |
| 7,938,009 | B2 | 5/2011 | Grant et al. |
| 7,978,182 | B2 | 7/2011 | Ording et al. |
| 8,061,223 | B2 | 11/2011 | Pan |
| 8,174,273 | B2 | 5/2012 | Geaghan |
| 8,217,909 | B2 | 7/2012 | Young |
| 8,253,425 | B2 | 8/2012 | Reynolds et al. |
| 8,280,119 | B2 | 10/2012 | Hamza |
| 8,314,780 | B2 * | 11/2012 | Lin et al. .................... 345/174 |
| 8,493,355 | B2 * | 7/2013 | Geaghan et al. ............ 345/174 |
| 8,725,443 | B2 | 5/2014 | Uzelac et al. |
| 8,773,377 | B2 | 7/2014 | Zhao et al. |
| 8,913,019 | B2 | 12/2014 | Zhao et al. |
| 8,914,254 | B2 | 12/2014 | Uzelac et al. |
| 8,982,061 | B2 | 3/2015 | Zhao et al. |
| 8,988,087 | B2 | 3/2015 | Uzelac et al. |
| 9,030,437 | B2 | 5/2015 | Uzelac et al. |
| 9,122,341 | B2 | 9/2015 | Benko et al. |
| 9,395,845 | B2 | 7/2016 | Uzelac et al. |
| 9,542,092 | B2 | 1/2017 | Zhao et al. |
| 9,710,105 | B2 | 7/2017 | Uzelac et al. |
| 2003/0164820 | A1 | 9/2003 | Kent |
| 2004/0207606 | A1 | 10/2004 | Atwood et al. |
| 2005/0012724 | A1 | 1/2005 | Kent |
| 2005/0046430 | A1 | 3/2005 | Kinnunen et al. |
| 2005/0063566 | A1 | 3/2005 | Beek et al. |
| 2006/0007177 | A1 | 1/2006 | McLintock |
| 2006/0097991 | A1 | 5/2006 | Hotelling et al. |
| 2006/0139340 | A1 | 6/2006 | Geaghan |
| 2006/0175485 | A1 | 8/2006 | Cramer |
| 2006/0227120 | A1 | 10/2006 | Eikman |
| 2007/0081726 | A1 | 4/2007 | Westerman et al. |
| 2007/0262968 | A1 | 11/2007 | Ohshita et al. |
| 2008/0041639 | A1 | 2/2008 | Westerman et al. |
| 2008/0062140 | A1 | 3/2008 | Hotelling et al. |
| 2008/0068229 | A1 | 3/2008 | Chuang |
| 2008/0150909 | A1 | 6/2008 | North et al. |
| 2008/0158185 | A1 | 7/2008 | Westerman |
| 2008/0180399 | A1 | 7/2008 | Cheng |
| 2008/0211778 | A1 | 9/2008 | Ording et al. |
| 2008/0211782 | A1 | 9/2008 | Geaghan et al. |
| 2008/0252616 | A1 | 10/2008 | Chen |
| 2008/0277171 | A1 | 11/2008 | Wright |
| 2008/0278453 | A1 * | 11/2008 | Reynolds et al. ............ 345/173 |
| 2008/0284899 | A1 | 11/2008 | Haubmann et al. |
| 2008/0309624 | A1 | 12/2008 | Hotelling |
| 2008/0309629 | A1 | 12/2008 | Westerman et al. |
| 2009/0009483 | A1 | 1/2009 | Hotelling et al. |
| 2009/0046073 | A1 | 2/2009 | Pennington et al. |
| 2009/0096753 | A1 | 4/2009 | Lim |
| 2009/0141046 | A1 | 6/2009 | Rathnam et al. |
| 2009/0157206 | A1 | 6/2009 | Weinberg et al. |
| 2009/0160763 | A1 | 6/2009 | Cauwels et al. |
| 2009/0174679 | A1 | 7/2009 | Westerman |
| 2009/0190399 | A1 | 7/2009 | Shibata et al. |
| 2009/0225036 | A1 * | 9/2009 | Wright .......................... 345/173 |
| 2009/0241701 | A1 | 10/2009 | Pan |
| 2009/0250268 | A1 | 10/2009 | Staton et al. |
| 2009/0251435 | A1 | 10/2009 | Westerman et al. |
| 2009/0251436 | A1 | 10/2009 | Keskin |
| 2009/0267903 | A1 | 10/2009 | Cady et al. |
| 2009/0273584 | A1 | 11/2009 | Staton |
| 2009/0289922 | A1 | 11/2009 | Henry |
| 2009/0303202 | A1 | 12/2009 | Liu et al. |
| 2009/0312009 | A1 | 12/2009 | Fishel |
| 2010/0007631 | A1 | 1/2010 | Chang |
| 2010/0053099 | A1 | 3/2010 | Vincent et al. |
| 2010/0060568 | A1 | 3/2010 | Fisher et al. |
| 2010/0060604 | A1 | 3/2010 | Zwart et al. |
| 2010/0073318 | A1 | 3/2010 | Hu et al. |
| 2010/0103118 | A1 | 4/2010 | Townsend et al. |
| 2010/0103121 | A1 | 4/2010 | Kim et al. |
| 2010/0117962 | A1 | 5/2010 | Westernan et al. |
| 2010/0134429 | A1 | 6/2010 | You et al. |
| 2010/0142765 | A1 | 6/2010 | Hamza |
| 2010/0193258 | A1 | 8/2010 | Simmons et al. |
| 2010/0214233 | A1 | 8/2010 | Lee |
| 2010/0231508 | A1 | 9/2010 | Cruz-Hernandez et al. |
| 2010/0265188 | A1 | 10/2010 | Chang et al. |
| 2010/0277505 | A1 | 11/2010 | Ludden et al. |
| 2010/0289754 | A1 | 11/2010 | Sleeman et al. |
| 2010/0302211 | A1 | 12/2010 | Huang |
| 2010/0309139 | A1 | 12/2010 | Ng |
| 2010/0315266 | A1 | 12/2010 | Gunawardana et al. |
| 2010/0315366 | A1 | 12/2010 | Lee et al. |
| 2010/0315372 | A1 | 12/2010 | Ng |
| 2011/0001633 | A1 | 1/2011 | Lam et al. |
| 2011/0018822 | A1 | 1/2011 | Lin et al. |
| 2011/0025629 | A1 | 2/2011 | Grivna et al. |
| 2011/0042126 | A1 | 2/2011 | Spaid et al. |
| 2011/0050620 | A1 | 3/2011 | Hristov |
| 2011/0080348 | A1 | 4/2011 | Lin et al. |
| 2011/0084929 | A1 * | 4/2011 | Chang et al. ................. 345/173 |
| 2011/0106477 | A1 | 5/2011 | Brunner |
| 2011/0115709 | A1 | 5/2011 | Cruz-Hernandez |
| 2011/0115747 | A1 | 5/2011 | Powell et al. |
| 2011/0122072 | A1 | 5/2011 | Lin et al. |
| 2011/0141054 | A1 | 6/2011 | Wu |
| 2011/0163766 | A1 | 7/2011 | Geaghan |
| 2011/0242001 | A1 | 10/2011 | Zhang et al. |
| 2011/0248941 | A1 | 10/2011 | Abdo et al. |
| 2011/0254865 | A1 | 10/2011 | Yee et al. |
| 2011/0261005 | A1 | 10/2011 | Joharapurkar et al. |
| 2011/0267481 | A1 | 11/2011 | Kagei |
| 2011/0298709 | A1 | 12/2011 | Vaganov |
| 2011/0298745 | A1 | 12/2011 | Souchkov |
| 2011/0299734 | A1 | 12/2011 | Bodenmueller |
| 2011/0304577 | A1 | 12/2011 | Brown |
| 2011/0304590 | A1 | 12/2011 | Su et al. |
| 2012/0030624 | A1 | 2/2012 | Migos |
| 2012/0032891 | A1 | 2/2012 | Parivar |
| 2012/0044194 | A1 | 2/2012 | Peng et al. |
| 2012/0065779 | A1 | 3/2012 | Yamaguchi et al. |
| 2012/0065780 | A1 | 3/2012 | Yamaguchi et al. |
| 2012/0068957 | A1 | 3/2012 | Puskarich et al. |
| 2012/0075331 | A1 | 3/2012 | Mallick |
| 2012/0105334 | A1 | 5/2012 | Aumiller et al. |
| 2012/0113017 | A1 | 5/2012 | Benko et al. |
| 2012/0131490 | A1 | 5/2012 | Lin et al. |

(56) References Cited

U.S. PATENT DOCUMENTS

| | | | |
|---|---|---|---|
| 2012/0146956 A1* | 6/2012 | Jenkinson | 345/178 |
| 2012/0153652 A1 | 6/2012 | Yamaguchi et al. | |
| 2012/0187956 A1 | 7/2012 | Uzelac | |
| 2012/0188197 A1 | 7/2012 | Uzelac | |
| 2012/0191394 A1 | 7/2012 | Uzelac | |
| 2012/0206377 A1 | 8/2012 | Zhao | |
| 2012/0206380 A1 | 8/2012 | Zhao | |
| 2012/0223894 A1 | 9/2012 | Zhao | |
| 2012/0268416 A1 | 10/2012 | Pirogov et al. | |
| 2012/0280934 A1* | 11/2012 | Ha | G06F 11/2221 345/174 |
| 2012/0280946 A1 | 11/2012 | Shih et al. | |
| 2012/0301009 A1 | 11/2012 | Dabic | |
| 2012/0319992 A1 | 12/2012 | Lee | |
| 2013/0016045 A1 | 1/2013 | Zhao | |
| 2013/0063167 A1 | 3/2013 | Jonsson | |
| 2013/0113751 A1 | 5/2013 | Uzelac | |
| 2013/0197862 A1 | 8/2013 | Uzelac et al. | |
| 2013/0238129 A1 | 9/2013 | Rose et al. | |
| 2013/0345864 A1 | 12/2013 | Park | |
| 2014/0081793 A1 | 3/2014 | Hoffberg | |
| 2014/0354310 A1 | 12/2014 | Hargrove et al. | |
| 2015/0160781 A1 | 6/2015 | Uzelac et al. | |
| 2015/0193083 A1 | 7/2015 | Uzelac et al. | |

FOREIGN PATENT DOCUMENTS

| | | |
|---|---|---|
| CN | 1942853 | 4/2007 |
| CN | 200947594 | 9/2007 |
| CN | 101553777 | 10/2009 |
| CN | 101661373 | 3/2010 |
| CN | 101681219 | 3/2010 |
| CN | 101819496 | 9/2010 |
| CN | 101937296 | 1/2011 |
| CN | 201828476 | 5/2011 |
| CN | 2201903594 | 7/2011 |
| CN | 202093112 | 12/2011 |
| CN | 101545938 | 1/2012 |
| CN | 202171626 | 3/2012 |
| CN | 202196126 | 4/2012 |
| CN | 102436334 | 5/2012 |
| CN | 101982783 | 7/2012 |
| DE | 19939159 | 3/2000 |
| EP | 2077490 | 7/2009 |
| EP | 2284654 | 2/2011 |
| JP | 2003303051 | 10/2003 |
| JP | 2007323731 | 12/2007 |
| JP | 2010055576 | 3/2010 |
| KR | 20050003155 | 1/2005 |
| KR | 20050094359 | 9/2005 |
| KR | 100763057 | 10/2007 |
| KR | 20080066416 | 7/2008 |
| KR | 100941441 | 2/2010 |
| KR | 20100067178 | 6/2010 |
| KR | 20100077298 | 7/2010 |
| KR | 20100129015 | 12/2010 |
| KR | 101007049 | 1/2011 |
| KR | 20110011337 | 2/2011 |
| KR | 101065014 | 9/2011 |
| TW | 200925966 | 6/2009 |
| TW | M361674 | 7/2009 |
| TW | M379794 | 5/2010 |
| TW | 201104513 | 2/2011 |
| WO | WO-9938149 | 7/1999 |
| WO | WO-2005114369 | 12/2005 |
| WO | WO-2006042309 | 4/2006 |
| WO | WO-2010073329 | 7/2010 |
| WO | WO-2012150274 | 11/2012 |
| WO | WO-20130063042 | 5/2013 |

OTHER PUBLICATIONS

"Haptic-Actuator Controllers", retrieved from <http://www.maxim-ic.com/products/data_converters/touch-interface/haptic-actuator.cfm> on May 4, 2011, 1 page.

"MAX11871", retrieved from <http://www.maxim-ic.com/datasheet/index.mvp/id/7203> on May 4, 2011, 2 pages.

Cravotta, Robert "The Battle for Multi-touch", *Embedded Insights*, retrieved from <http://www.embeddedinsights.com/channels/2011/04/12/the-battle-for-multi-touch/> on May 4, 2011,(Apr. 12, 2011),3 pages.

Pratt, Susan "Factors Affecting Sensor Response", *Analog Devices, AN-830 Application Note*, Available at <http://www.analog.com/static/imported-files/application_notes/52957377291382187​42AN830_0.pdf>,(Dec. 2005),pp. 1-8.

"Final Office Action", U.S. Appl. No. 13/152,991, (dated Sep. 20, 2013),14 pages.

"Final Office Action", U.S. Appl. No. 13/183,377, (dated Oct. 15, 2013),12 pages.

"Final Office Action", U.S. Appl. No. 13/293,060, (dated Sep. 25, 2013),10 pages.

"Non-Final Office Action", U.S. Appl. No. 13/156,243, (dated Sep. 19, 2013),12 pages.

"Actuation Force of Touch Screen", *Solutions @ Mecmesin*, retrieved from <http://www.ArticleOnePartners.com/index/servefile?fileId=188971>,(Dec. 31, 2010), 1 page.

"AO Touch Screen Tester", retrieved from <http://www.ao-cs.com/Projects/touch%20screen%20tester%20project.html>, (Dec. 31, 2010), 1 page.

"Final Office Action", U.S. Appl. No. 12/941,693, (dated Nov. 26, 2012), 22 Pages.

"How to Use the Precision Touch Testing Tool", retrieved from <http://feishare.com/attachments/article/279/precision-touch-testing-tool-Windows8-hardware-certification.pdf>, (Apr. 15, 2012),10 pages.

"International Search Report", Application No. PCT/US2011/058855, (dated Nov. 1, 2011), 8 pages.

"Linearity Testing Solutions in Touch Panels", retrieved from <advantech.com/machine-automation/.../%7BD05BC586-74DD-4BFA-B81A-2A9F7ED489F/>, (Nov. 15, 2011), 2 pages.

"MicroNav Integration Guide Version 3.0", retrieved from <http://www.steadlands.com/data/interlink/micronavintguide.pdf>, (Dec. 31, 2003),11 pages.

"Microsoft Windows Simulator Touch Emulation", retrieved from <blogs.msdn.com/b/visualstudio/archive/2011/09/30/microsoft-windows-simulator-touch-emulation.aspx>, (Sep. 30, 2011), 3 pages.

"Non-Final Office Action", U.S. Appl. No. 12/941,693, (dated Jul. 18, 2012),19 pages.

"Non-Final Office Action", U.S. Appl. No. 13/152,991, (dated Mar. 21, 2013),10 pages.

"OptoFidelity Touch & Test", retrieved from <http://www.ArticleOnePartners.com/index/servefile?fileId=188969, (Feb. 20, 2012), 2 pages.

"OptoFidelity Touch and Test", retrieved from <http://www.ArticleOnePartners.com/index/servefile?fileId=188420>, (May 4, 2012), 2 pages.

"OptoFidelity Two Fingers—robot", video available at <http://www.youtube.com/watch?v=YppRASbXHfk&feature=player_embedded#!section>, (Sep. 15, 2010), 2 pages.

"PCT Search Report and Written Opinion", Application No. PCT/US2011/055621, (dated Jun. 13, 2012), 8 pages.

"PCT Search Report and Written Opinion", Application No. PCT/US2012/027642, (dated Sep. 3, 2012), 9 pages.

"PCT Search Report and Written Opinion", Application No. PCT/US2012/024780, (dated Sep. 3, 2012), 9 pages.

"PCT Search Report and Written Opinion", Application No. PCT/US2012/024781, (dated Sep. 3, 2012), 9 pages.

"Projected Capacitive Test Fixture", retrieved from <http://www.touch-intl.com/downloads/DataSheets%20for%20Web/6500443-PCT-DataSheet-Web.pdf>, (2009), 2 pages.

"Resistive Touch Screen_Resistance Linearity Test", video available at <http://www.youtube.com/watch?v=hb23GpQdXXU>, (Jun. 17, 2008), 2 pages.

(56) References Cited

OTHER PUBLICATIONS

"Smartphone Automatic Testing Robot at UEI Booth", video available at <http://www.youtube.com/watch?v=f-Q4ns-b9sA>, (May 9, 2012), 2 pages.

"STM23S-2AN NEMA 23 Integrated Drive+Motor", Retrieved from: <http://www.applied-motion.com/products/integrated-steppers/stm23s-2an> on Jan. 24, 2012,3 pages.

"Technology Comparison: Surface Acoustic Wave, Optical and Bending Wave Technology", *3M Touch Systems*, Available at >http://multimedia.3m.com/mws/mediawebserver?mwsId=66666UuZjcFSLXTtnXT2NXTaEVuQEcuZgVs6EVs6E666666--&fn=DST-Optical-SAW%20Tech%20Brief.pdf>,(2009), pp. 1-4.

"Touch Panel Inspection & Testing Solution", retrieved from <http://www.ArticleOnePartners.com/index/servefile?fileId=188967>, (Dec. 31, 2010),1 page.

"Touch Panel Semi-Auto Handler Model 3810", retrieved from <http://www.chromaus.com/datasheet/3810_en.pdf>, (Dec. 31, 2010), 2 pages.

"TouchSense Systems Immersion", retrieved from <http://www.ArticleOnePartners.com/index/servefile?fileId=188486>, (Jun. 19, 2010), 20 pages.

"Using Low Power Mode on the MPR083 and MPR084", *Freescale Semiconductor Application Note*, Available at <http://cache.freescale.com/files/sensors/doc/app_note/AN3583.pdf>,(Nov. 2007), pp. 1-5.

Asif, Muhammad et al., "MPEG-7 Motion Descriptor Extraction for Panning Camera Using Sprite Generated", *In Proceedings of AVSS 2008*, Available at <http://ieeexplore.ieee.org/stamp/stamp.jsp?tp=&arnumber=4730384>,(Sep. 2008), pp. 60-66.

Baraldi, Stefano et al., "WikiTable: Finger Driven Interaction for Collaborative Knowledge-Building Workspaces", *Proceedings of the 2006 Conference on Computer Vision and Pattern Recognition Workshop (CVPRW '06)*, available at <<http://ieeexplore.ieee.org/stamp/stamp.jsp?tp=&arnumber=1640590>>,(Jul. 5, 2006), 6 pages.

Benko, Hrvoje et al., "Resolving Merged Touch Contacts", U.S. Appl. No. 12/914,693, filed Nov. 8, 2010, 22 pages.

Binns, Francis S., "Multi-"Touch" Interaction via Visual Tracking", *Bachelor of Science in Computer Science with Honours, The University of Bath*, available at <<http://www.cs.bath.ac.uk/~mdv/courses/CM30082/projects.bho/2008-9/Binns-FS-dissertation-2008-9.pdf>>,(May 2009), 81 pages.

Brodkin, Jon "Windows 8 hardware: Touchscreens, sensor support and robotic fingers", <<http://arstechnica.com/business/news/2011/09/windows-8-hardware-touch-screens-sensor-support-and-robotic-fingers.ars>>, (Sep. 13, 2011), 1 Page.

Buffet, Y "Robot Touchscreen Analysis", <<http://ybuffet.posterous.com/labsmotocom-blog-archive-robot-touchscreen-an>>, (Apr. 19, 2010), 2 Pages.

Cao, Xiang et al., "Evaluation of an On-line Adaptive Gesture Interface with Command Prediction", *In Proceedings of GI 2005*, Available at <http://citeseerx.ist.psu.edu/viewdoc/download;jsessionid=DAB1B08F620C23464427932BAF1ECF49?doi=10.1.1.61.6749&rep=rep1&type=pdf>,(May 2005), 8 pages.

Cao, Xiang et al., "ShapeTouch: Leveraging Contact Shape on Interactive Surfaces", *In Proceedings of TABLETOP 2008*, Available at <http://www.cs.toronto.edu/~caox/tabletop2008_shapetouch.pdf>,(2008), pp. 139-146.

Dang, Chi T., et al., "Hand Distinction for Multi-Touch Tabletop Interaction", *University of Augsburg; Institute of Computer Science; Proceedings of the ACM International Conference on Interactive Tabletops and Surfaces*, (Nov. 23-25, 2009), 8 pages.

Dillencourt, Michael B., et al., "A General Approach to Connected-Component Labeling for Arbitrary Image Representations", *Journal of the Association for Computing Machinery*, vol. 39, No. 2, available at <<http://www.cs.umd.edu/~hjs/pubs/DillJACM92.pdf>>,(Apr. 1992), pp. 253-280.

Dillow, Clay "Liquid-Filled Robot Finger More Sensitive to Touch Than a Human's", retrieved from <www.popsci.com/technology/article/2012-06/new-robot-finger-more-sensitive-touch-human> on Jul. 27, 2012, (Jun. 19, 2012), 3 pages.

Hoggan, Eve et al., "Mobile Multi-Actuator Tactile Displays", *In 2nd international conference on Haptic and audio interaction design*, retrieved from <http://www.dcs.gla.ac.uk/~stephen/papers/HAID2.pdf >,(Oct. 29, 2007),12 pages.

Hoshino, et al., "Pinching at finger tips for humanoid robot hand", Retrieved at <<http://web.mit.edu/zoz/Public/HoshinoKawabuchiRobotHand.pdf>>, (Jun. 30, 2005), 9 Pages.

Kastelan, et al., "Stimulation Board for Automated Verification of Touchscreen-Based Devices", *22nd International Conference on Field Programmable Logic and Applications*, Available at <https://www2.lirmm.fr/lirmm/interne/BIBLI/CDROM/MIC/2012/FPL_2012/Papers/PHD7.pdf>,(Aug. 29, 2012), 2 pages.

Kastelan, et al., "Touch-Screen Stimulation for Automated Verification of Touchscreen-Based Devices", *In IEEE 19th International Conference and Workshops on Engineering of Computer Based Systems*, (Apr. 11, 2012), pp. 52-55.

Khandkar, Shahedul H., et al., "Tool Support for Testing Complex MultiTouch Gestures", *ITS 2010*, Nov. 7-10, 2010, Saarbrucken, Germany, (Nov. 7, 2010), 10 pages.

Kjellgren, Olof "Developing a remote control application for Windows CE", *Bachelor Thesis performed in Computer Engineering at ABE Robotics, Miilardalen University, Department of Computer Science and Electronics*, Retrieved at <<http://www.idt.mdh.se/utbildning/exjobblfiles/TR0661.pdf>>,(May 30, 2007), 43 Pages.

Kuosmanen, Hans "OptoFidelity Automating UI Testing", video available at <http://www.youtube.com/watch?v=mOZ2r7ZvyTg&feature=player_embedded#!section>, (Oct. 14, 2010), 2 pages.

Kuosmanen, Hans "Testing the Performance of Touch-Enabled Smartphone User Interfaces", retrieved from <http://www.ArticleOnePartners.com/index/servefile?fileId=188442>, (Dec. 31, 2008), 2 pages.

Levin, Michael et al., "Tactile-Feedback Solutions for an Enhanced User Experience", retrieved from >http://www.pbinterfaces.com/documents/Tactile_Feedback_Solutions.pdf>, (Oct. 31, 2009), pp. 18-21.

McGlaun, Shane "Microsoft's Surface 2.0 Stress Testing Robot Called Patty Shown off for First Time", Retrieved at <<http://www_.slashgear._com/microsofts-surface-2_-0-stress-testing-robot_-called-patty-shown-off_-for_-first-time-19172971/>>, (Aug. 19, 2011), 1 Page.

McMahan, William et al., "Haptic Display of Realistic Tool Contact via Dynamically Compensated Control of a Dedicated Actuator", *International Conference on Intelligent Robots and Systems*, St. Louis, MO, Oct. 11-15, 2009, retrieved from <http://repository.upenn.edu/meam_papers/222>,(Dec. 15, 2009), 9 pages.

Takeuchi, et al., "Development of a Muti-fingered Robot Hand with Softness changeable Skin Mechanism", *International Symposium on and 2010 6th German Conference on Robotics (ROBOTIK)*, Retrieved at <<http://ieeexplore.ieee.org/stamp/stamp.jsp?arnumber=05756853>>,(Jun. 7, 2010), 7 Pages.

Tao, Yufei et al., "An Efficient Cost Model for Optimization of Nearest Neighbor Search in Low and Medium Dimensional Spaces", *Knowledge and Data Engineering*, vol. 16 Issue:10, retrieved from <<http://www.cais.ntu.edu.sg/~jzhang/papers/ecmonns.pdf>> on Mar. 16, 2011,(Oct. 2004),16 pages.

Terpstra, Brett "BetterTouchTool Makes Multi-touch Infinitely More Useful, for Free", retrieved from <http://www.tuaw.com/2010/01/05/bettertouchtool-makes-multi-touch-infinitely-more-useful-for-fr/> on Jul. 20, 2012, (Jan. 5, 2010), 4 pages.

Toto, Serkan "Video: Smartphone Test Robot Simulates Countless Flicking and Tapping", retrieved from <techcrunch.com/2010/12/21/video-smartphone-test-robot-simulates-countless-flicking-and-tapping/>, (Dec. 21, 2010), 2 pages.

Tsuchiya, Sho et al., "Vib-Touch: Virtual Active Touch Interface for Handheld Devices", *In Proceedings of The 18th IEEE International Symposium on Robot and Human Interactive Communication*, Available at <http://www.mech.nagoya-.u.ac.jp/asi/en/member/shogo_okamoto/papers/tsuchiyaROMAN2009.pdf>,(Oct. 2009), pp. 12-17.

Westman, Tapani et al., "Color Segmentation by Hierarchical Connected Components Analysis with Image Enhancement by Sym-

(56) References Cited

OTHER PUBLICATIONS metric Neighborhood Filter", *Pattern Recognition, 1990. Proceedings., 10th International Conference on Jun. 16-20, 1990*, retrieved from <<http://ieeexplore.org/stamp/stamp.jsp?tp=&arnumber=118219>>on Mar. 16, 2011,(Jun. 16, 1990), pp. 796-802.
Wilson, Andrew D., "TouchLight: An Imaging Touch Screen and Display for Gesture-Based Interaction", *In Proceedings of ICIM 2004*, Available at <http://citeseerx.ist.psu.edu/viewdoc/download?doi=10.1.1.95.3647&rep=rep1&type=pdf>,(Oct. 2004), 8 pages.
Wimmer, Raphael et al., "Modular and Deformable Touch-Sensitive Surfaces Based on Time Domain Reflectometry", *In Proceedings of UIST 2011*, Available at <http://www.medien.ifi.lmu.de/pubdb/publications/pub/wimmer2011tdrTouch/wimmer2011tdrTouch.pdf>,(Oct. 2011),10 pages.
Zivkov, et al., "Touch Screen Mobile Application as Part of Testing and Verification System", *Proceedings of the 35th International Convention*, (May 21, 2012), pp. 892-895.
"Input Testing Tool", U.S. Appl. No. 13/659,777, filed Oct. 24, 2012, 31 pages.
"Non-Final Office Action", U.S. Appl. No. 12/941,693, (dated May 16, 2013), 13 pages.
"Non-Final Office Action", U.S. Appl. No. 13/183,377, (dated Jun. 21, 2013), 10 pages.
"Non-Final Office Action", U.S. Appl. No. 13/293,060, (dated Jul. 12, 2013), 9 pages.
"PCT Search Report and Written Opinion", Application No. PCT/US2013/021787, (dated May 13, 2013),9 pages.
"Touch Quality Test Robot", U.S. Appl. No. 13/530,692, filed Jun. 22, 2012, 20 pages.
"Final Office Action", U.S. Appl. No. 13/154,161, dated Apr. 22, 2014, 16 pages.
"Final Office Action", U.S. Appl. No. 13/530,692, dated Apr. 10, 2014, 16 pages.
"Foreign Office Action", CN Application No. 201210018527.8, dated Feb. 24, 2014, 10 Pages.
"Foreign Office Action", CN Application No. 201210029859.6, dated Feb. 21, 2014, 15 Pages.
"International Search Report and Written Opinion", Application No. PCT/US2013/061067, dated Feb. 7, 2014, 11 pages.
"Non-Final Office Action", U.S. Appl. No. 13/099,288, dated Feb. 6, 2014, 13 pages.
"Non-Final Office Action", U.S. Appl. No. 13/152,991, dated Mar. 21, 2014, 18 pages.
"Non-Final Office Action", U.S. Appl. No. 13/183,377, dated Feb. 27, 2014, 12 pages.
"Non-Final Office Action", U.S. Appl. No. 13/530,692, dated Jan. 31, 2014, 14 pages.
"Notice of Allowance", U.S. Appl. No. 13/156,243, dated Jan. 28, 2014, 8 pages.
"Foreign Office Action", CN Application No. 201210031164.1, dated Mar. 5, 2014, 14 Pages.
"Restriction Requirement", U.S. Appl. No. 13/205,319, dated May 8, 2014, 6 pages.
"Non-Final Office Action", U.S. Appl. No. 13/293,060, dated Nov. 29, 2013, 11 pages.
"PCT Search Report and Written Opinion", Application No. PCT/US2013/046208, dated Sep. 27, 2013, 12 pages.
"Non-Final Office Action", U.S. Appl. No. 13/154,161, dated Jan. 3, 2014, 14 pages.
"Non-Final Office Action", U.S. Appl. No. 12/941,693, dated Nov. 18, 2013, 21 Pages.
"Notice of Allowance", U.S. Appl. No. 13/198,415, dated Dec. 26, 2013, 8 pages.
"Corrected Notice of Allowance", U.S. Appl. No. 13/362,238, dated Nov. 18, 2014, 2 pages.
"Final Office Action", U.S. Appl. No. 13/293,060, dated Nov. 6, 2014, 14 pages.
"Foreign Notice of Allowance", TW Application No. 101100606, dated Sep. 29, 2014, 4 pages.
"Foreign Office Action", CN Application No. 201210018527.8, dated Oct. 29, 2014, 12 pages.
"Foreign Office Action", CN Application No. 201210029859.6, dated Oct. 17, 2014, 8 Pages.
"Foreign Office Action", CN Application No. 201210446236.9, dated Dec. 3, 2014, 11 pages.
"Notice of Allowance", U.S. Appl. No. 13/099,288, dated Oct. 28, 2014, 9 pages.
"Notice of Allowance", U.S. Appl. No. 13/154,161, dated Nov. 7, 2014, 10 pages.
"Notice of Allowance", U.S. Appl. No. 13/205,319, dated Dec. 19, 2014, 8 pages.
"Search Report", TW Application No. 101100609, dated Oct. 16, 2014, 1 page.
"Corrected Notice of Allowance", U.S. Appl. No. 13/205,319, dated Apr. 2, 2015, 2 pages.
"Corrected Notice of Allowance", U.S. Appl. No. 13/530,692, dated Apr. 23, 2015, 4 pages.
"Final Office Action", U.S. Appl. No. 13/152,991, dated May 6, 2015, 20 pages.
"Foreign Office Action", CN Application No. 201210029859.6, dated Apr. 7, 2015, 8 Pages.
"Non-Final Office Action", U.S. Appl. No. 13/293,060, dated Jun. 2, 2015, 14 pages.
"Notice of Allowance", U.S. Appl. No. 12/941,693, dated May 6, 2015, 8 pages.
"Foreign Office Action", CN Application No. 201210018527.8, dated Jul. 10, 2015, 13 Pages.
"Final Office Action", U.S. Appl. No. 13/905,093, dated Aug. 19, 2015, 17 pages.
"Foreign Notice of Allowance", CN Application No. 201210031164.1, dated Jul. 6, 2015, 3 Pages.
"Foreign Office Action", CN Application No. 201210029859.6, dated Oct. 21, 2015, 7 Pages.
"Foreign Office Action", CN Application No. 201210446236.9, dated Nov. 13, 2015, 13 pages.
"Non-Final Office Action", U.S. Appl. No. 13/152,991, dated Dec. 14, 2015, 15 pages.
"Non-Final Office Action", U.S. Appl. No. 14/662,512, dated Oct. 5, 2015, 8 pages.
"Final Office Action", U.S. Appl. No. 13/293,060, dated Dec. 31, 2015, 17 pages.
"Foreign Notice of Allowance", CN Application No. 201210029859.6, dated Feb. 6, 2016, 4 Pages.
"Foreign Office Action", CN Application No. 201210018527.8, dated Jan. 18, 2016, 15 pages.
"Non-Final Office Action", U.S. Appl. No. 13/905,093, dated Jan. 29, 2016, 17 pages.
"Extended European Search Report", EP Application No. 11840170.2, dated Jul. 16, 2014, 10 pages.
"Final Office Action", U.S. Appl. No. 13/152,991, dated Aug. 20, 2014, 14 pages.
"Foreign Notice of Allowance", CN Application No. 201110349777.5, dated May 28, 2014, 6 pages.
"Foreign Office Action", CN Application No. 201210031164.1, dated Sep. 11, 2014, 9 Pages.
"Non-Final Office Action", U.S. Appl. No. 13/530,692, dated Aug. 25, 2014, 18 pages.
"Non-Final Office Action", U.S. Appl. No. 13/205,319, dated Sep. 9, 2014, 13 pages.
"Non-Final Office Action", U.S. Appl. No. 13/293,060, dated Jul. 23, 2014, 12 pages.
"Notice of Allowance", U.S. Appl. No. 12/941,693, dated Aug. 13, 2014, 8 pages.
"Notice of Allowance", U.S. Appl. No. 13/183,377, dated Jul. 18, 2014, 7 pages.
"Notice of Allowance", U.S. Appl. No. 13/362,238, dated Jul. 28, 2014, 11 pages.
"Supplemental Notice of Allowance", U.S. Appl. No. 13/362,238, dated Sep. 18, 2014, 4 pages.
"Corrected Notice of Allowance", U.S. Appl. No. 13/156,243, dated Jun. 6, 2014, 4 pages.

(56) References Cited

OTHER PUBLICATIONS

"Foreign Office Action", TW Application No. 101100606, dated Apr. 15, 2014, 10 pages.
"Non-Final Office Action", U.S. Appl. No. 13/099,288, dated Jun. 10, 2014, 22 pages.
"Advisory Action", U.S. Appl. No. 13/293,060, dated Mar. 26, 2015, 2 pages.
"Corrected Notice of Allowance", U.S. Appl. No. 13/154,161, dated Feb. 24, 2015, 2 pages.
"Corrected Notice of Allowance", U.S. Appl. No. 13/205,319, dated Feb. 26, 2015, 2 pages.
"Foreign Office Action", CN Application No. 201210031164.1, dated Feb. 16, 2015, 7 Pages.
"Non-Final Office Action", U.S. Appl. No. 13/152,991, dated Dec. 31, 2014, 18 pages.
"Non-Final Office Action", U.S. Appl. No. 13/905,093, dated Feb. 20, 2015, 18 pages.
"Notice of Allowance", U.S. Appl. No. 12/941,693, dated Jan. 12, 2015, 8 Pages.
"Notice of Allowance", U.S. Appl. No. 13/530,692, dated Mar. 3, 2015, 8 pages.
"Final Office Action", U.S. Appl. No. 13/152,991, dated Jul. 20, 2016, 11 pages.
"Foreign Office Action", CN Application No. 201210018527.8, dated Jun. 28, 2016, 15 pages.
"Non-Final Office Action", U.S. Appl. No. 14/620,819, dated Aug. 12, 2016, 22 pages.
"Notice of Allowance", U.S. Appl. No. 13/152,991, dated Aug. 25, 2016, 8 pages.
"Non-Final Office Action", U.S. Appl. No. 13/293,060, dated Apr. 13, 2016, 10 pages.
"Final Office Action", U.S. Appl. No. 13/905,093, dated Jun. 15, 2016, 18 pages.
"Foreign Notice of Allowance", TW Application No. 100135900, dated Mar. 28, 2016, 4 pages.
"Foreign Notice of Allowance", TW Application No. 103124288, dated Apr. 14, 2016, 4 pages.
"Foreign Notice of Allowance", CN Application No. 201210446236.9, dated Apr. 26, 2016, 4 pages.
"Notice of Allowance", U.S. Appl. No. 14/662,512, dated Apr. 19, 2016, 8 pages.
"Extended European Search Report", EP Application No. 12744979.1, dated Mar. 28, 2017, 10 pages.
"Final Office Action", U.S. Appl. No. 14/620,819, dated Jan. 27, 2017, 9 pages.
"Foreign Notice of Allowance", CN Application No. 201210018527.8, dated Jan. 9, 2017, 4 pages.
"Notice of Allowance", U.S. Appl. No. 13/293,060, dated Mar. 22, 2017, 9 pages.
"Corrected Notice of Allowance", U.S. Appl. No. 13/152,991, dated Nov. 21, 2016, 2 pages.
"Corrected Notice of Allowance", U.S. Appl. No. 13/152,991, dated Dec. 12, 2016, 2 pages.
"Extended European Search Report", EP Application No. 12744496.6, dated Oct. 7, 2016, 8 pages.
"Final Office Action", U.S. Appl. No. 13/293,060, dated Nov. 14, 2016, 17 pages.
"Notice of Allowance", U.S. Appl. No. 13/905,093, dated Jun. 7, 2017, 13 pages.
"Notice of Allowance", U.S. Appl. No. 14/620,819, dated Apr. 18, 2017, 9 pages.
"Notice of Allowance", U.S. Appl. No. 13/293,060, dated Jun. 14, 2017, 9 pages.

* cited by examiner

300

CONTACT GEOMETRY TESTS

RELATED APPLICATIONS

This application claims priority under 35 U.S.C. Section 119(e) to U.S. Provisional Patent Application No. 61/435,672, filed Jan. 24, 2011 and titled "Touchscreen Testing," the entire disclosure of which is hereby incorporated by reference.

BACKGROUND

Display and input techniques utilized by computing devices are ever evolving. For example, initial computing devices were provided with monitors. A user interacted with the computing device by viewing simple text on the monochrome monitor and entering text via a keyboard that could then be viewed on the monitor. Other techniques were then subsequently developed, such as graphical user interfaces and cursor control devices.

Display and input techniques have continued to evolve, such as to sense touch using a touchscreen display of a computing device to recognize gestures. A user, for instance, may interact with a graphical user interface by inputting a gesture using the user's hand that is detected by the touchscreen display. However, traditional techniques that were utilized to test touchscreen displays were often inaccurate and therefore were typically inadequate to test the touchscreen displays as suitable for intended use of the device.

SUMMARY

Touchscreen testing techniques are described. In one or more implementations, a piece of conductor (e.g., metal) is positioned as proximal to a touchscreen device and the touchscreen device is tested by simulating a touch of a user. This technique may be utilized to perform a variety of different testing of a touchscreen device, such as to test latency and probabilistic latency. Additional techniques are also described including contact geometry testing techniques.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Conventional techniques that were utilized to test touchscreen devices were often difficult to reproduce. Consequently, test results from these conventional techniques could be inaccurate and difficult to interpret and thus often failed for their intended purpose.

Touchscreen testing techniques are described herein. In one or more implementations, techniques are described in which a touch input of a part of a user's body is simulated by using a conductor (e.g., an electrical conductor such as a piece of metal) that is grounded. For example, the conductor may be shaped to approximate a shape and/or area of a portion of a user's finger that is typically used to contact a touchscreen device and grounded to mimic contact of a user's finger with the device. The metal may then alternate between grounded and ungrounded (i.e., floating) states to mimic contact and non-contact by a user's finger, respectively. Thus, the touchscreen device may be tested using the metal contact without having to move the metal contact (e.g., using a mechanical switch). Additional techniques are also described that do not involve use of the conductor. Further discussion of these techniques may be found in the following discussion in corresponding sections.

In the following discussion, an example environment is first described that may employ the testing techniques described herein. Example procedures are then described which may be performed in the example environment as well as other environments. Consequently, performance of the example procedures is not limited to the example environment and the example environment is not limited to performance of the example procedures.

Example Environment

Figure 1:
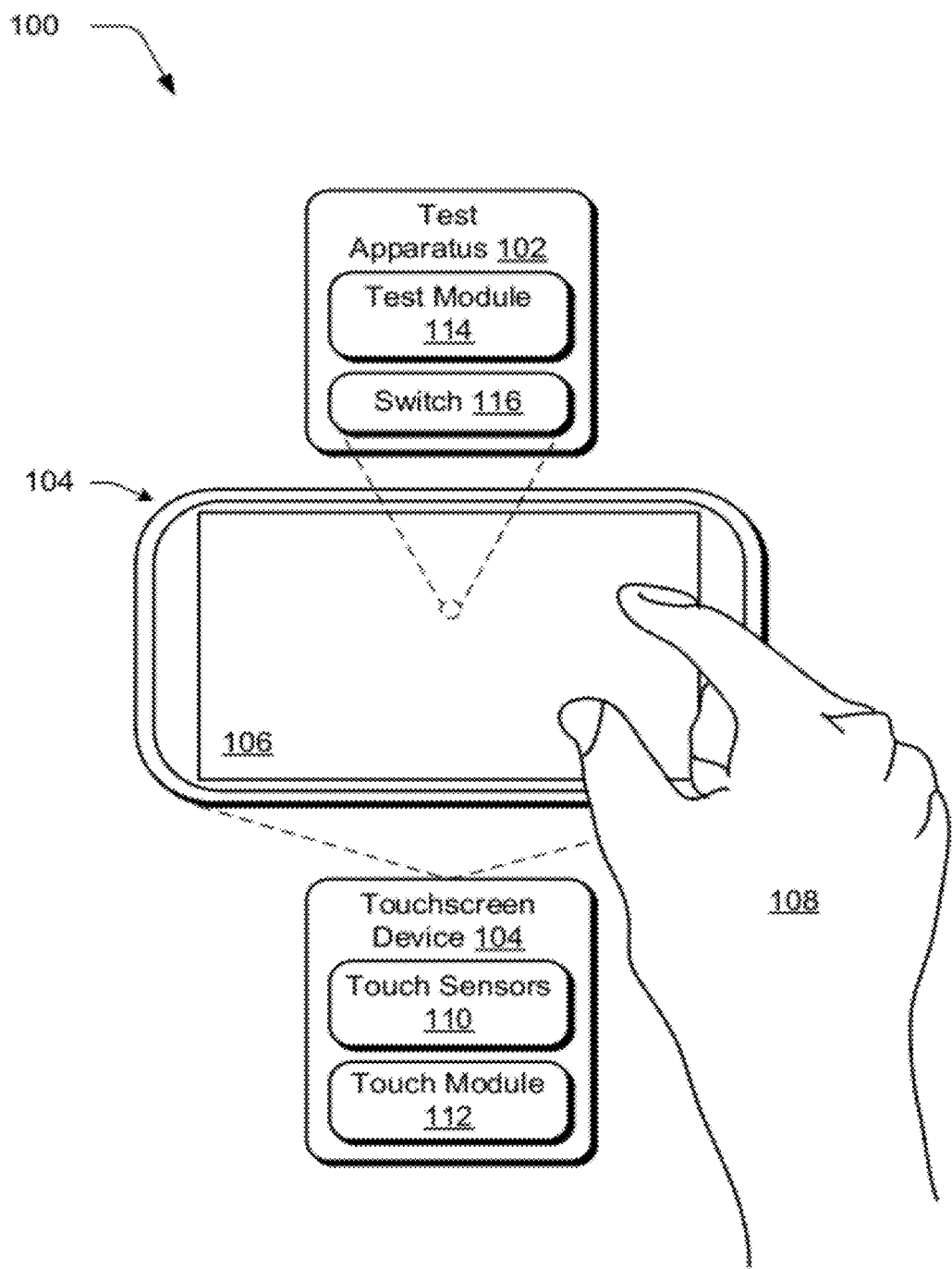
FIG. 1 is an illustration of an environment in an example implementation that is operable to utilize touchscreen testing techniques described herein.

FIG. 1 depicts an environment 100 in an example implementation that includes a test apparatus 102 that is suitable to test a touchscreen device 104. The touchscreen device 104 may be configured in a variety of ways. For example, the touchscreen device 104 may be configured as part of a mobile communication device such as a mobile phone, a portable game-playing device, a tablet computer, as part of a traditional computing device (e.g., a display device that is part of a laptop or personal computer), and so on.

Additionally, the touchscreen 106 of the touchscreen device 104 may be configured in a variety of ways. For example, the touchscreen 106 of the touchscreen device 104 may include sensors that are configured to detect proximity (e.g., contact) with the touchscreen 106. Touch sensors 110 are typically used to report actual contact with the touchscreen 106, such as when being touched with a finger of a user's hand 108.

Examples of such touch sensors 110 include capacitive touch sensors. For instance, in projected capacitance an X-Y grid may be formed across the touchscreen using near optically transparent conductors (e.g., indium tin oxide) to detect contact at different X-Y locations on the touchscreen 106. Other capacitance techniques are also contemplated, such as surface capacitance, mutual capacitance, self-capacitance, and so on. Further, other touch sensors 110 are also contemplated in other instances, such as infrared, optical imaging, dispersive signal technology, acoustic pulse recognition, and so on.

Regardless of the type of touch sensors 110 used, inputs detected by the touch sensors 110 may then be processed by the touch module 112 to detect characteristics of the inputs, which may be used for a variety of purposes. For example, the touch module 112 may recognize that the touch input indicates selection of a particular object, may recognize one or more inputs as a gesture usable to initiate an operation of the touchscreen device 104 (e.g., expand a user interface), and so forth. However, this processing may rely upon the accuracy of the inputs and therefore conventional techniques that were utilized to test the touchscreen 106 could result in an inaccurate touchscreen making it to market, which could hinder a user's interaction with the device.

In one or more implementations described herein, contact with a touchscreen 106 by a finger of a user's hand 108 is emulated by the test apparatus 102. For example, the test apparatus 102 may include a test module 114 and switch 116, which are configured to place a metal piece against the touchscreen 106. The switch 116, for instance, may be configured as a projected capacitance switch circuit that is used to alternate the conductor between grounded and ungrounded states. In this way, the switch 116 may effectively emulate a finger of a user's hand without moving the conductor. In other words, "up" and "down" touch events may mimic a press and removal of the user's finger without movement. These techniques may be utilized for a variety of different techniques, examples of which may be found in the corresponding sections.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the techniques described below are platform-independent, meaning that the techniques may be implemented on a variety of commercial computing platforms having a variety of processors.

For example, the test apparatus 102 and/or the touchscreen device 104 may be implemented using a computing device. The computing device may also include an entity (e.g., software) that causes hardware of the computing device to perform operations, e.g., processors, functional blocks, a "system-on-a-chip," and so on. For example, the computing device may include a computer-readable medium that may be configured to maintain instructions that cause the computing device, and more particularly hardware of the computing device to perform operations. Thus, the instructions function to configure the hardware to perform the operations and in this way result in transformation of the hardware to perform functions. The instructions may be provided by the computer-readable medium to the computing device through a variety of different configurations.

One such configuration of a computer-readable medium is signal bearing medium and thus is configured to transmit the instructions (e.g., as a carrier wave) to the hardware of the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Adjustment of Grounding

Figure 2:
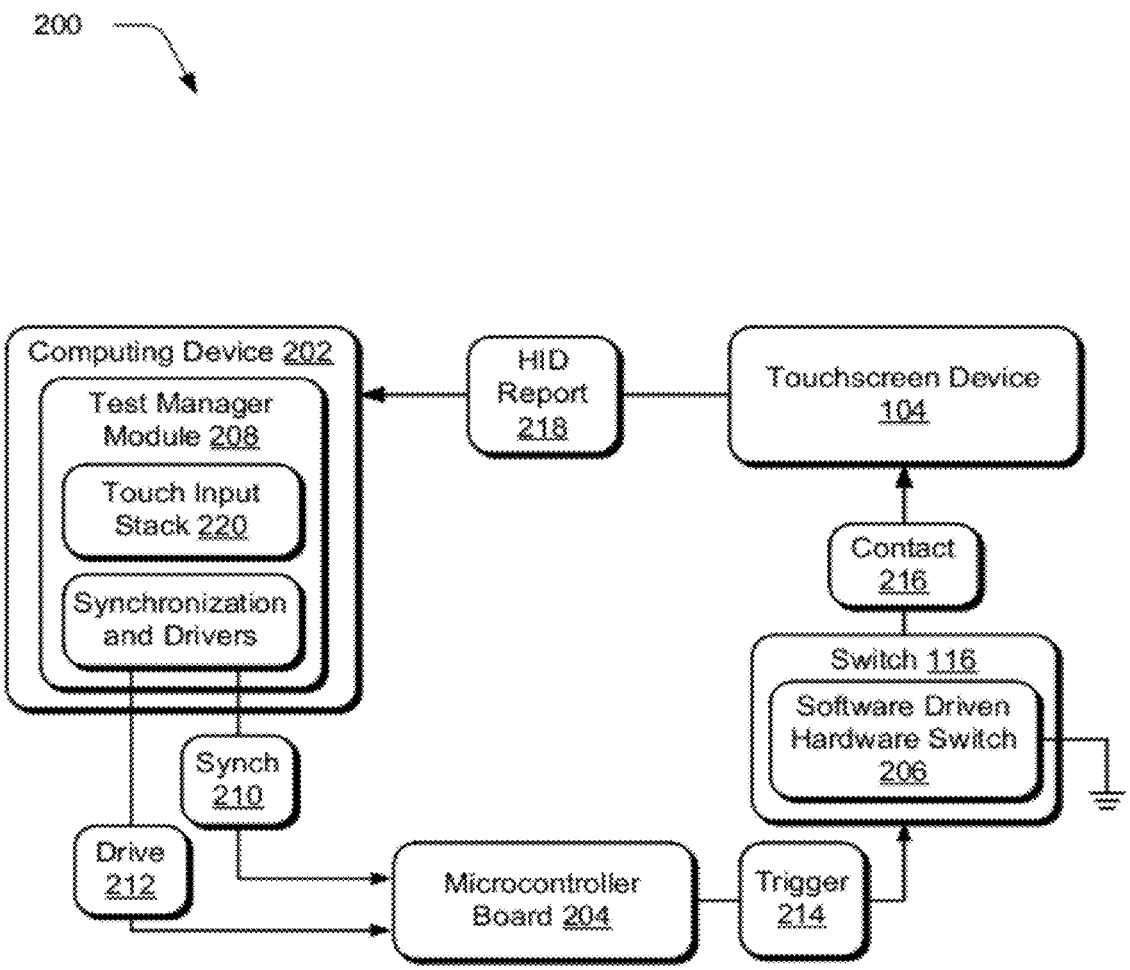
FIG. 2 is an illustration of a system in an example implementation showing a test apparatus of FIG. 1 as being implemented using a computing device.

FIG. 2 is an illustration of a system 200 in an example implementation showing the test apparatus 102 of FIG. 1 as being implemented using a computing device 202. Although illustrated separately, the computing device 202 includes a microcontroller board 204 (e.g., AT90USBKEY), the switch 116 configured as a software driven hardware switch 206 that is electrically coupled to a metal contact, and a touchscreen device 104 with is the device under test. In this example the touchscreen device 104 is configured as having a mutual or self-capacitance touch screen.

The computing device 202 is illustrated as including a test manager module 208 that is representative of functionality to manage the testing of the touchscreen device 104. The test manager module 208, for instance, may execute an application to synchronize 210 clocks (e.g., timers) on computing device 202 and the microcontroller board 204 and then drive 212 the microcontroller board 204.

Once a command is received by the microcontroller board 204 from the computing device 202, the microcontroller board 204 may trigger 214 the software driven hardware switch 206, such as to alternate between grounded and ungrounded (e.g., floating) states. Although a single switch is shown, it should be readily apparent that the system 200 may incorporate other numbers of switches, e.g., two, three, or even more, and the switch 116 may incorporate more than one grounded-metal contact. Thus, contact 216 of a grounded metal portion of the switch 116 with the touchscreen device 104 may be used to emulate both a touch and lack of a touch on the touchscreen device 104 under test by alternating between the states.

The touchscreen device 104 may then report contact through an HID report 218 to the computing device 202. For example, the HID report 218 may propagate through a touch input stack 220 to be reported to the test manager module 208, e.g., as WM_INPUT and WM_POINTER message in a WndProc function. The test manager module 208 may then process these messages and provide visual feedback, such as in a graphical user interface. Other examples of data that may be processed include HID over $I^2C$.

In an example system 200, the drive 212 signal may occur every two seconds although other time periods are also contemplated, such as non-periodical time intervals. This may result in a "contact down" event for two seconds, followed with a "contact up" event for the next two seconds by alternating between grounded and ungrounded states, respectively. LEDs disposed on the microcontroller board 204 may be used indicate both "up" and "down" events. Additionally, a rectangle in a top left corner of a display device of the computing device 202 may change color each time a WM_INPUT report is received.

As stated above, the test manager module 208 (e.g., through a hsync application) may be used to drive the microcontroller board 204 by sending "down" and "up" events at predefined intervals (e.g., two seconds) although other intervals are also contemplated. The test manager module 208 may also be used to listen for raw HID report 218 messages from the touchscreen device 104, e.g., WM_INPUT message. Upon receipt of each message, the test manager module 208 may render a rectangle (e.g., in a top left corner of a display device of the computing device 202), e.g., with a different color to provide feedback although other feedback mechanisms are also contemplated. A log file may also be generated by the test manager module 208 to describe the test performed. The microcontroller board 204 may also provide feedback, e.g., using two LEDs on the board in which one is for a "down" event and one is for an "up" event.

In an example situation when grounding is adjusted as described below, 2*f HID reports 218 may be expected for each two seconds of a DOWN event, in which "f" is a reporting rate for a touch sensor. For a touchscreen device 104 that reports at 105 Hz, for instance, two-hundred and ten messages may be expected to be received during the two seconds the switch 116 emulates "down" through a grounded state. Further, it is expected that few to no messages are received during the two seconds the switch 116 emulates an "up" event mimicked by an ungrounded state, e.g., expect for the first fifty to one hundred milliseconds right after the "up" even has been initiated due to latency. This information may be described in the log file generated by the test manager module 208.

The test manager module 208, for instance, may generate three log files. The first log file may summarize "down" event latency, the second log file may summarize "up" event latency, and the third log file may describe each of the logged information. An example of the log file is given in the following table:

```
freq = 2337920,
[1; 1; 4157019762]: 67233 us ± 1898 us 194
[3; 1; 4166371459]: 58207 us ± 1817 us 195
[5; 1; 4175723151]: 50159 us ± 1737 us 195
[7; 1; 4185074835]: 54075 us ± 1661 us 195
[9; 1; 4194426526]: 38007 us ± 1582 us 197
[11; 1; 4203778217]: 37887 us ± 1503 us 197
[13; 1; 4213129911]: 49844 us ± 1423 us 195
[15; 1; 4222481609]: 53665 us ± 1339 us 195
[17; 1; 4231833295]: 57747 us ± 1262 us 195
[19; 1; 4241184991]: 53546 us ± 1180 us 195
[21; 1; 4250536685]: 57453 us ± 1098 us 195
[23; 1; 4259888382]: 37387 us ± 2016 us 197
[25; 1; 4269240085]: 37267 us ± 1943 us 197
```

The first column in this example represents an index of the event, with each of the odd, the even events are in the "up" summary. The second column includes an identifier of the event, e.g., "1" equals "down" and "3" equals "up." The third column includes a real time timestamp. The fourth column describes actual measured "down"/"up" latency. The fifth column indicates an absolute (maximal) error in measurement, and finally the sixth column indicates number of messages received during the "down"/"up" event, e.g., during the two seconds of the event.

For reference, an excerpt from the second log file is presented below:

```
freq = 2337920,
[2; 3; 4161695608]: 65997 us ± 1861 us 7
[4; 3; 4171047311]: 57916 us ± 1776 us 6
[6; 3; 4180398993]: 61869 us ± 1703 us 7
[8; 3; 4189750682]: 65743 us ± 1633 us 7
[10; 3; 4199102374]: 65658 us ± 1551 us 7
[12; 3; 4208454063]: 57592 us ± 1479 us 6
[14; 3; 4217805764]: 61475 us ± 1387 us 7
[16; 3; 4227157451]: 65488 us ± 1311 us 7
[18; 3; 4236509143]: 57339 us ± 1231 us 6
[20; 3; 4245860840]: 61275 us ± 1154 us 7
[22; 3; 4255212531]: 65165 us ± 1068 us 7
[24; 3; 4264564234]: 65079 us ± 1977 us 7
[26; 3; 4273915933]: 57014 us ± 1901 us 6
```

The sixth column may be used to adjust grounding. The grounding condition may be adjusted in such way to obtain a repeatable number of packets for each measurement. In one or more implementations it is expected this number may vary, e.g., in the example above it varies from 194-197, which is about one to two percent of the time. For instance, a variation of up to ten percent may be considered permissible, and amounts above this value may be investigated. Once the setup and expected parameters are understood, the actual grounding adjustment may be performed.

In one or more implementations, a SNR (signal to noise ratio) is set at or near a highest possible value to select a proper grounding condition. One way to adjust grounding is to access the raw data, the procedure for adjusting ground in case this data is not available is also described below.

When raw data is available (e.g., from the HID report 218), the SNR may be calculated as follows. The amplitude of the touch (e.g., a change in an electrostatic field or changed perceived capacitance) as reported by the digitizers of the touchscreen device 104 is compared to the noise reported by the digitizer. An upper limit (i.e., the "highest possible value) to SNR may be established by simply pressing a finger against the digitizer and reading the reported amplitude. It may be normal to have lower SNR values for emulated touch, even as low as half of the upper limit.

Figure 3:
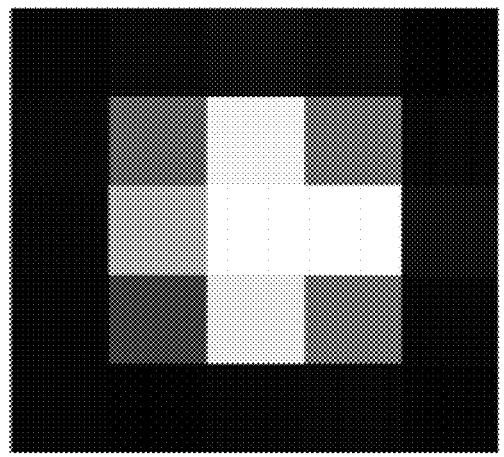
FIG. 3 is an illustration of a representation of a matrix of touch amplitudes

First, the proper environmental conditions are selected. It may be noted particular conditions may not be involved, but that results could depend on the conditions. Next, a readout is made in case a human finger is pressed against the digitizer, a matrix of amplitudes, which may be similar to the table below and the image as shown in the example implementation of FIG. 3. Particular care may be made to a maximum value of the amplitude, which in this case would be 255. Reading out the noise may not be performed as long the noise levels are not changed in the presence of the switch, which may not happen in this case. The following table is an example of raw touch data, illustration of which is shown in the example implementation 300 of FIG. 3.

| 10 | 20 | 30 | 22 | 6 |
|---|---|---|---|---|
| 16 | 106 | 246 | 118 | 16 |
| 14 | 182 | 255 | 255 | 30 |
| 10 | 64 | 236 | 120 | 14 |
| 10 | 6 | 12 | 16 | 8 |

In a next step, a metal contact that is electrically coupled to the switch 116 is introduced to a touch digitizer of the touchscreen device 104. This may effectively change a baseline of the digitizer, which may involve a certain period for recalibrating. For example, a touch digitizer may perform this automatically in a process referred to as rebaselining and may take from a fraction of a second up to two minutes. This process may be tracked by observing the raw data, e.g., the HID report 218. Once noise levels in the area of the switch 116 become similar or the same as in the remainder of the digitizer, the next step is performed.

In some implementations, rebaselining may not be a trivial task for a digitizer and it could happen that digitizer does not reach average noise levels. If this is the case, the grounding may be adjusted. This may be done in several interactions, starting from a relatively small amount grounding (e.g., no grounding) and gradually increasing the amount until finally a large metal piece that is not connected to the power grid ground is attached, e.g., a metal table, unplugged computer box and similar, use of a human body as a ground, and so on. Usually a lack of grounding may enable the re-baselining. The minimum and maximum amount of metal used to allow re-baselining may be observed and recorded. As a result of this procedure, ghost touches (e.g., false positive indications of touch) do not occur while switch is in passive state in most instances.

The switch 116 may then be set to active state to emulate touch, e.g., by placing the conductor in a grounded state. This procedure may be similar to the previous procedure, but this time the highest amplitude of the touch compared to the previously established upper bound is determined.

An optimal amount of grounding material may be selected given the four mentioned values, e.g., in the middle of their intersection. For example, passive minimum and maximum may be lower than active minimum and maximum, thereby yielding the following intersection: [active minimum, passive maximum].

After this process is concluded the following setup may be achieved. First, while in a passive state there are no ghost touches whereas while active there are no false negative touches that involve failure to report a touch, i.e., a full frame rate is reported. Additionally, the affected baseline may have the same noise distribution as the rest of the digitizer and the maximum amplitude may be the best possible (e.g., best SNR)

In case raw data is not accessible a slightly indirect technique may be used in which reported touch events instead of the raw data from the HID report 218. In this case, the procedure starts with no grounding material and a test is performed of both passive and actives states. The amount of grounding is then gradually increased such that in a passive state there are no ghost touches and in the active state there are no missed touch reports, e.g., at a maximum frame rate. Minimum and maximum amounts of grounding are obtained such that two conditions above are met. Finally, an approximate middle of this range is selected as the optimal or near optimal grounding condition.

Figure 4:
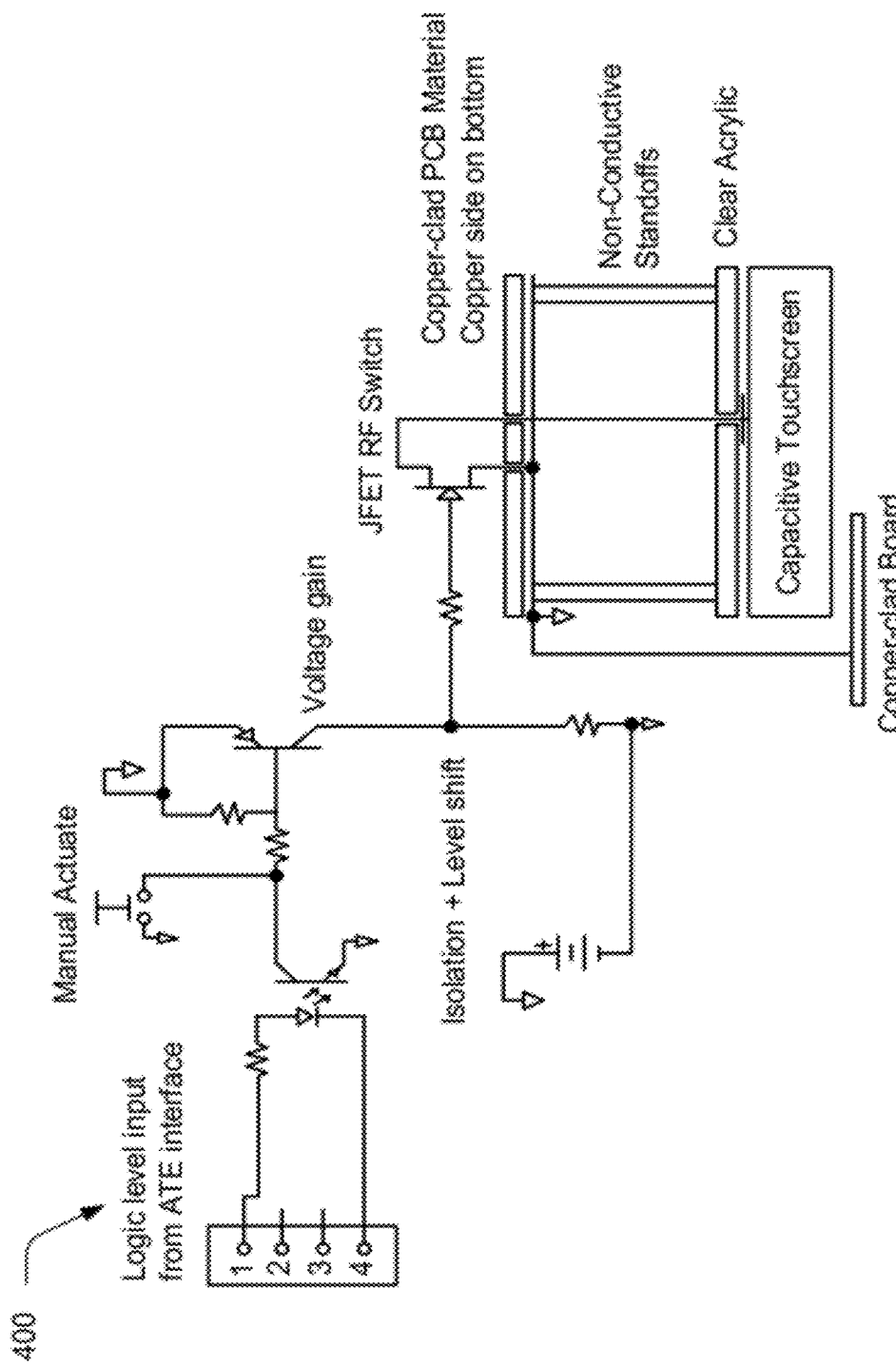
FIG. 4 depicts an implementation example of the system of FIG. 2.

FIG. 4 depicts an implementation example 400 of the system 200 of FIG. 2. In this example implementation 400, a RF JFET can be used as a high speed switching circuit. It should be noted that this implementation may be optimized for emulating a particular touch screen device. For example, the proposed grounding of the copper-clad board (e.g., 1.8"×3.9") may be modified for implementation on different touchscreen devices as described above.

Latency Measurement

Latency is a measure of time delay experienced in the touch digitizer system and accordingly latency measurement is a part of the touchscreen's 106 digitizer evaluation process. Inherent latency represents a tradeoff between several features: noise levels (SNR), sensitivity, power consumption, jitter, and so on. In this section, an automated and repeatable way of measuring latency for capacitive touchscreens 106 (both mutual and self-capacitance) is described, as well as for other touchscreens.

End Points for Latency Measurement

A starting point for latency measurement may be defined as a moment at which contact is made with a touchscreen 106, e.g., a point in time at which a finger, stylus, actuator, or so on touches the touchscreen 106 for the first time.

The end points for latency measurement may be defined in a variety of ways. For example, an end point may be defined to coincide with an end of scanning such that the end point is on the target side (firmware) and represents a moment at which the scanning of raw touch image is completed with the touch present on the image. In another example, the end point may be defined as the end of processing. This end point is expected to be on the target side (firmware) and represents a moment at which touch is detected by the firmware and ready to be reported. In a USB implementation, for instance, this may be the moment when target interrupt is set to active, informing host USB controller there is a message ready.

In a further example, an end point is defined as a host entry (e.g., computing device 202) point. This is the first end point on a host side and represents a moment when the host operating system is first aware of the message from target touchscreen device 104. This may involve a signification part of the evaluation process of the touchscreen device 104 and is usually referred to as "hardware latency". In yet another example, an end point may be defined to provide information about touch input stack performance, such as to employ WndProc end points such as WM_INPUT, WM_TOUCH, and WM_POINTER messages.

In yet a further example, an end point may be defined as a screen feedback end point (e.g., end-to-end latency), namely the moment visual feedback is provided on the display device for the first time after the contact occurs. This example incorporates rendering (application specific), video card refresh rate (usually 60 Hz) and screen latency.

In the following section, a focus is made toward early host side end points, host entry point (hardware latency) and WndProc end points (touch input stack latency), although other points are also contemplated. Additional information about firmware end points (e.g., scanning and processing) as well as a touchscreen device's 104 feedback end point (e.g., end-to-end latency) may be found at the "Probabilistic Latency Modeling" section below.

Actuator Circuit for Capacitive Touch Devices

As previously mentioned in relation to FIG. 1, touching of the touchscreen device 104 by a user's hand 108 may be accurately emulated with placing a conductor (e.g., a piece of metal) on top of the touchscreen device 104 and grounding the conductor. Accordingly, an electrical actuator circuit may be used to ground the conductor on demand and hence accurately emulate a "real" finger of the user's hand 108.

It is worth noting that contact geometry is driven with the size of the metal piece and that shape and size of contact geometry is not an issue with this approach, while it is for manual testing, especially when it comes to repeatability. For more information please refer to "Contact Geometry Tests" section below.

As previously described, there are a wide variety of actuator circuit implementations that may be used for the testing techniques described herein. As shown in FIG. 4, for instance, an RF JFET switch can be used to ground the conductor on demand with relatively low latency, e.g., which may be well below 50 µs. A low capacitance fast Reed relay may also be used as a switching circuit. Further, a fast double pole single throw (DPST) switch for manual actuation may also be used in which a first pole grounds the conductor and a second pole may be polled by the microcontroller board 204 in order to establish the time of contact for minimal interference, e.g., minimal perceived capacitance.

Various mechanical sensors may also be used to detect acoustic waves which occur when finger touches the screen. In one implementation, a microphone pressed against the screen may be used as a mechanical sensor to accurately detect a time at which a contact first occurred. This may be implemented as a manual test which is non-invasive and hence useful for independently confirming measured results obtained with other approaches. In this section, non-manual implementations are described which may allow performance of a large number of tests, which is beneficial due to the probabilistic nature of the latency. For more information, please refer to "Probabilistic Latency Modeling" section below.

Return will now be made to the example system 400 of FIG. 4. This system 400 is but one of a variety of possible implementations of an RF JFET actuator circuit. It should be noted that this implementation may be optimized for emulating a particular touch screen device, such as to select a correct amount of grounding as described above in the "Adjusting Grounding" section.

As previously stated, the testing device may be configured to include an actuator, a conductor (e.g., an interchangeable copper contact), a switch 116 such as a JFET RF switching circuit with optical coupling for input logic, digital (logic) ground, a +5V digital input as well as an input line for system grounding, a twelve volt battery, and a three pin contact.

The switch 116 may be driven in a variety of ways. For example, a COM port of the computing device 202 may be used to drive the switch 116. In another example, a USB based microcontroller board 204 may be used to provide desired controllability.

By synchronizing the clocks on the computing device 202 and the microcontroller board 204, feedback may be provided without introducing synchronization errors. As previously mentioned, clocks on computing device 202 and microcontroller board 204 may be synchronized in order to reduce absolute error of measurement to a minimum. Depending on the resolution desired, three kinds of synchronization may be differentiated. In a first example, synchronization is not performed. As such, the computing device 202 sends requests to microcontroller board 204 and the microcontroller performs the request immediately, e.g., before acknowledging the receipt of the USB/HID packet. With this approach absolute error rate may fall between one to two milliseconds and the microcontroller board 204 is made available right away.

In a second example, simple synchronization is performed that may take from ten seconds and up to a minute. In this example, a clock on the microcontroller board 204 is assumed to be running at a given previously established frequency. With this approach, error rate may be around one millisecond in some implementations. In a third example, full synchronization is performed that may take from ten minutes and up to an hour in some implementations. In this case, the clock frequency of the microcontroller board 204 is considered unknown and is established during synchronization. Absolute error with this approach may be as low as 500 μs.

As previously mentioned, several different setups may be used for latency measurement, on example of which was described in relation to FIG. 2. The computing device 202 may be used to drive the microcontroller board 204 and the microcontroller board 204 may be used to drive the switch 116. Once a conductor attached to the switch 116 is placed in active state (i.e., effectively emulating touch by grounding a conductor), a device under test (e.g., the touchscreen device 104) may report back to the computing device 202, e.g., using the HID report 218. With the HID report the circle is completed and the computing device 202 has the information with which to measure latency. For instance, this information may describe when the contact was initiated (which is being driven by the computing device 202) as well as when the HID report 218 is received.

A variety of different endpoints may be used for latency measurement as discussed above. For WndProc endpoints, for instance, access to an operating system's messaging system may be used to perform this measurement. For example, a window may be created by an application that has a window class which specifies a "lpfnWndProc" parameter. The WM_INPUT, WM_TOUCH and WM_POINTER messages may then be caught from a WndProc function. This approach allows WndProc messages latency to be measured with a single executable and without preparation on the computing device 202.

For user convenience, visual feedback may be incorporated for both the computing device 202 and the microcontroller board 204. On the computing device 202, for instance, a rectangle may be rendered in the top left corner of the screen whenever WM_INPUT message is received from the touchscreen device 104, each time with a different color. This may represent the visual indication that messages are being received from the device under test. On target side two LEDs may be used to indicate passive and active state, one for each respectively. Computing device 202 and target visual feedback allow user to be confident during measurement as previously described.

A test driving signal (e.g., drive 212) may occur at defined intervals, e.g., every two seconds, at irregular intervals, and so on. In this example, the defined intervals may result in a contact DOWN event for two seconds, followed by the contact UP event for the next two seconds. Mentioned LEDs and top-left rectangle may indicate this behavior. In one situation (e.g., assuming proper adjustment of grounding), a user performing the test can expect 2*f HID reports for each two seconds of DOWN event and no reports during UP event, except for a few reports in the first ~100 ms of the UP event due to the latency.

The measurements may be acquired during the test by the computing device 202. After the test is concluded, the data may be serialized to storage. There may be three files serialized as previously described, e.g., a first log file containing a summary for DOWN events, a second log file containing a summary for UP events, and a third log file with each of the recorded events as shown above.

Error in Measurement

In this section, the issue of error in measurement is addressed for the setup described above. One type of error typically comes from host to target communication channel, e.g., between the touchscreen device 104 and the computing device 202. For example, USB polling frequency for full speed devices may involve one millisecond of latency (in case bInterval parameter of the device descriptor is set to one) and host USB driver processing stack may be added to this, which may yield up to two milliseconds latency in this example. However, the rest of the system is not typically responsible for more than 50 μs.

For example, the microcontroller board 204 may operate at $\%_{16}$ MHz and instructions may be executed yielding latency of about 1 μs. The RF JFET switch may similarity cause latency in an amount less than 1 μs. What remains is optocoupler (3-5 μs latency, as indicated by the data sheet) and transistor logic before RF JFET, and the latency introduced here may be less than 45 μs, yielding less than 50 μs in the hardware altogether. Since 50 μs is significantly smaller than 500-2000 μs latency introduced by the host to target communication channel, this value may be ignored in one or more implementations, although other implementations are contemplated.

Interpreting Results

As further discussed in the "Probabilistic Latency Modeling" section below, touchscreen device 104 latency may involve a probabilistic measure. For example, this measure may depend on the position of contact with the touchscreen device 104 as well as the relative position of the scan beam compared to this contact position at the moment of contact. Further, a complicated distribution may be obtained when inherent latency of USB is added (e.g., related to the requested polling frequency through "bInterval" parameter in device descriptor) along with relatively complex input stack processing.

Understanding a latency distribution may involve a relatively large number of measurements. For practical purposes a range of measured latencies as well as empirical distribution function may be sufficient for the purposes of this investigation, although other implementations are also contemplated.

Figure 5:
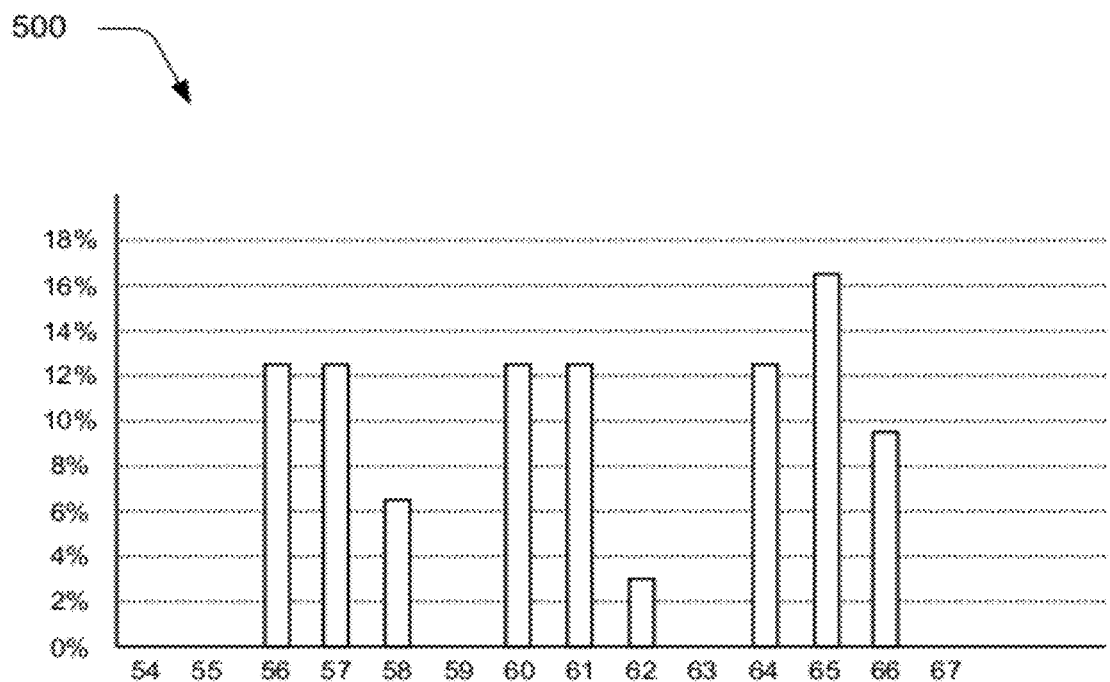
FIG. 5 depicts an example distribution histogram that describes a range of reported latencies.

One way of presenting empirical distribution function is the distribution histogram. An example for the distribution histogram 500 is presented in FIG. 5. From this histogram the range of reported latencies (from 56 to 66 ms) may be read. Additionally, a sense of the distribution may be obtained, which in this instance the distribution seems to be rather uniform.

Repeated measurements in different parts of the touchscreen device 104 (e.g., top left corner, center, bottom right corner) may yield histogram distributions of the same kind that are shifted in time. Manually (visually) verifying that the distributions are of the same kind (or automatically using a Kolmogorov-Smirnov test, although it may be quite sufficient to look at the histograms) is a step for building the confidence of the measurement process. Both DOWN and UP event latencies may be measured. In an implementation, the latency distribution is quantified using a range of possible latency values.

In one or more implementations, the touch digitizer operates in three pipelined stages:
  Scan the raw touch image
  Process the image
  Report touch contacts The three mentioned pipes may run in parallel. For example, the first pipe scans the image while the second may process the previously scanned image, and the last pipe may report contacts from the one before previous. This allows a prediction to be generated for histogram distribution based on the scanning rate frequency "f" for period "T". In the example below, an assumption is made that the scanning frequency is 100 Hz (10 ms for scanning period) and interlacing does not occur (for simplicity), although other examples are also contemplated.

In a "best case scenario" for top-left corner of the touchscreen device 104 is that contact occurs a moment before scanning beam scans that corner. The beam may scan an entire image before processing may occur, which may add ten milliseconds of latency as further described in relation to FIG. 8. Processing may take up to ten milliseconds, and reporting may take from zero to "bInterval" milliseconds in this example. In an ideal case, bInterval is set to one so that overall hardware latency for this particular case is set to 20-21 milliseconds.

Figure 8:
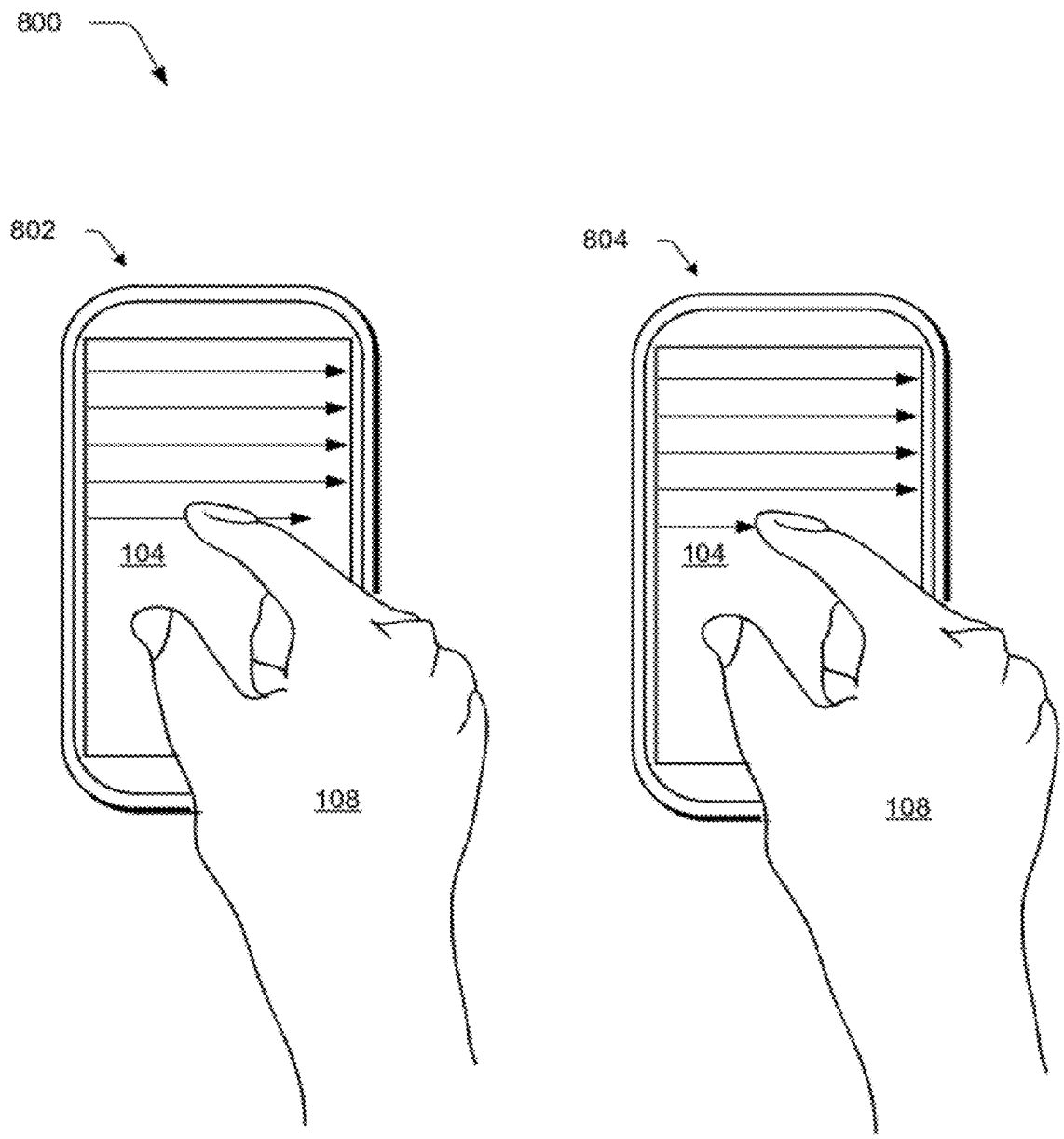
FIG. 8 depicts an example implementation showing first and second cases in which a touch occurs directly before and after a scan by a display device, respectively.

In a "worst case scenario," contact of the conductor may have "just missed" the scanning beam as also shown an described in relation to FIG. 8. This may add an additional scanning period (e.g., T equals ten milliseconds) to the overall hardware latency, which would become 30-31 milliseconds.

Figure 6:
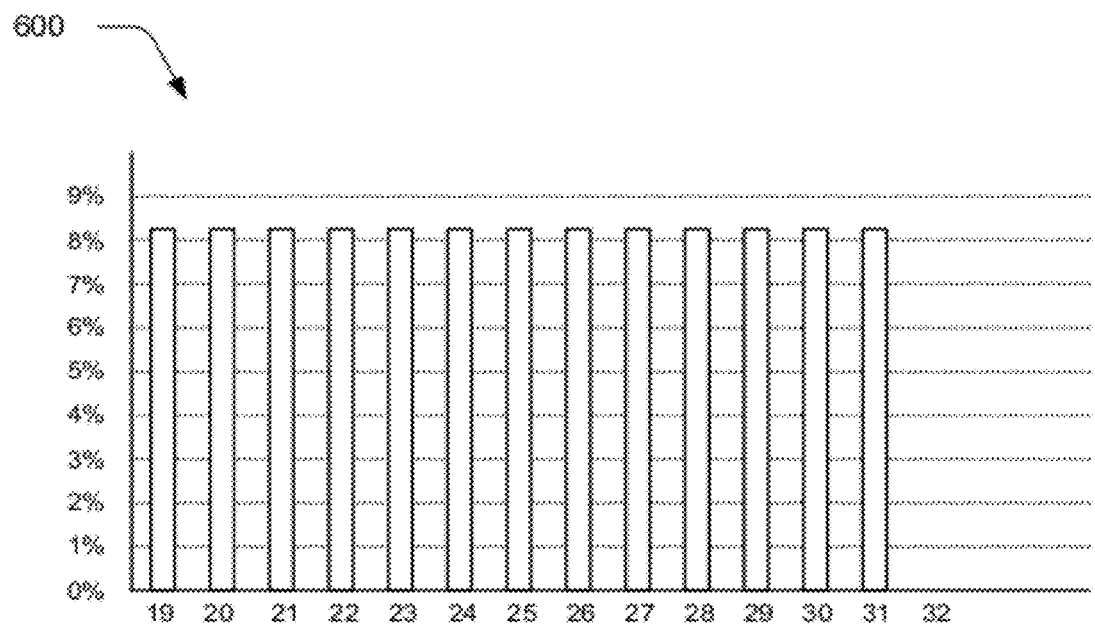
FIG. 6 depicts an example distribution histogram that describes an ideal uniform distribution.

The distribution between the best and the worst case scenarios may depend on the position of the scanning beam in the moment of contact, and it may be safe to assume that this distribution is uniform. An example of an ideal uniform distribution 600 with mentioned parameters is given in FIG. 6.

Figure 7:
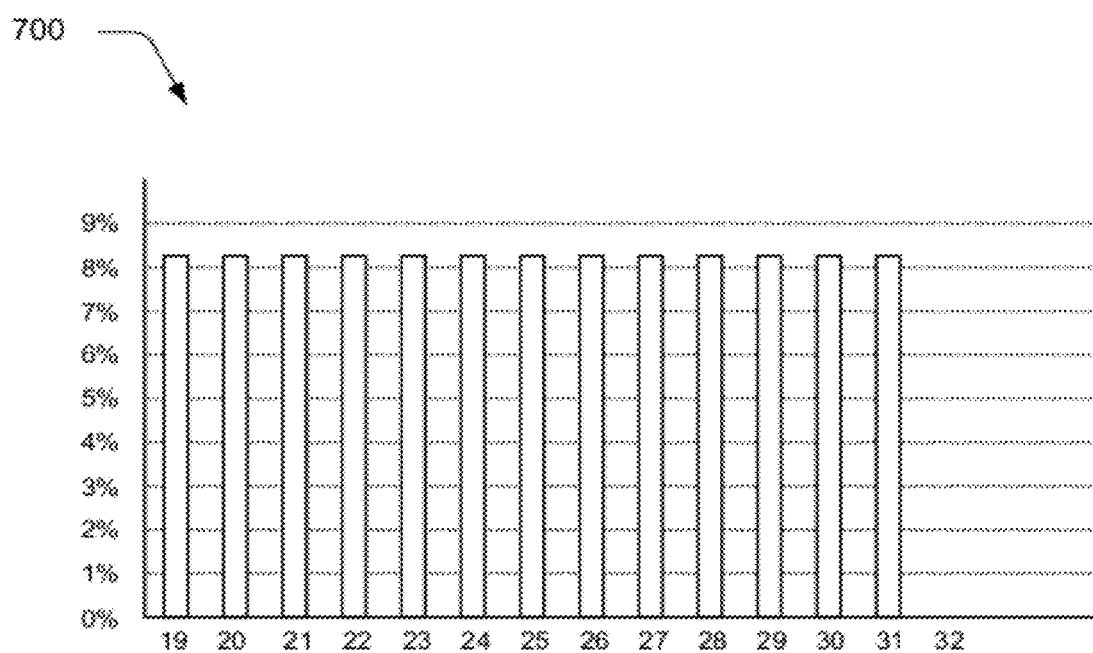
FIG. 7 depicts an example histogram distribution of ideal hardware latency for the bottom right corner of a display device.

A similar distribution may be expected for the bottom right corner of the digitizer, the difference is that scanning beam does not finish scanning of the entire image, reducing the overall hardware latency by the scanning period, e.g., ten milliseconds. A histogram distribution 700 of ideal hardware latency for the bottom right corner is presented in FIG. 7. From these figures it is shown that an ideal latency range for a 100 Hz scanning touchscreen device 104 is about 10 to 31 milliseconds. The same distribution histograms may stand for both DOWN and UP events.

Probabilistic Latency Modeling

In this section a probabilistic end-to-end latency model is described, which may employ parametric statistics. At the end, a methodology is also described for obtaining end-to-end latency measurements as well as techniques of fitting that data to parametric distributions.

FIG. 8 depicts an example implementation showing first and second cases 802, 804 in which a touch occurs directly after and before a scan by a display device, respectively. Although this discussion focuses on hardware latency, these techniques may also be used for graphics card or USB poll latencies as well.

A touch processing pipeline typically starts with a raw signal scan, where each row-to-column intersection is scanned for change of electric field, e.g., change of effective capacitance. The scanning process may be performed at about fifty to two hundred frames per second, such as due to physical restraints imposed on the device which may include linear resistance of the ITO layer lines, mutual capacitance, combined yielding RC time relaxation constant, noise from display further impairs the scanning rate, and so on. It should be readily apparent that other scanning rates are also contemplated.

As shown in a first case 802 of FIG. 8, a scan is shown through the use of arrows and a finger of a user's hand 108 is shown as positioned "behind" the scan, e.g., the scan has already passed a point of contact of the finger against the touchscreen device 104. Thus, the touch input has occurred just after (e.g., 20 ns after) a corresponding position is scanned. Since the contact occurs just after the scanning took place, this touch input may remain unnoticed until the next scanning cycle. Consequently, ten to twenty milliseconds of latency may be introduced, depending on the scanning rate.

As shown in the second case 804, however, a touch input is detected "right away." In other words, a coordinate that corresponds to the touch input is scanned approximately when contact was achieved. This is shown as the touch input corresponding with the arrow of the scan. Therefore, in this case scan latency is not introduced. Thus, from these examples it may be readily understood that scanning alone introduces variable latency depending on the position and timing of touch contact and depending on the scanning rate.

With this in mind, actual latency may be modeled. Since this example model is probabilistic, latency is modeled as a random variable L. Each part of end-to-end touch processing pipeline contributes and therefore each part may be modeled as another random variable with known distribution, but with unknown parameters of that distribution which may be described as follows:

$$L = L_{E2E} = L_{HW} + L_{USB} + L_{INPUT\ STACK} + L_{GRAPHICS} + L_{SCREEN}$$

It should be noted that in one or more implementations each of the components can be considered independent of another for practical purposes, although other scenarios may also exist that involve components that are dependent on one another.

The list of contributing parameters may be defined as follows. In the first approximation $L_{HW}$ is a random variable with a uniform distribution of range $[l_{HW1}, l_{HW2}]$. A decent first approximation for $l_{HW1}$ and $l_{HW2}$ is closely related to the scanning rate f ($l_{HW1}=1/f, l_{HW2}=2/f$). Another approximation incorporates additional time for processing and reporting, which may depend on the number of contacts being traced. Another approximation may include the position of the touch contact, as this alone significantly influences hardware latency.

Consider this test case, two distinct touch points, one in the top left and the other in the bottom right corner of the digitizer. Further consider different relationships in relation to the scan for each of these cases, one in which the scan occurred "right before" the touch input and another one in which the scan occurred "right after" the touch input. For the top left point, latency numbers would be 1/f and 2/f (f being the scanning rate), while for the bottom right point latency would be 0 and 1/f. This shows a significant difference between latencies in one compared to the other part of the touchscreen 106.

Additionally, USB polling frequency (125 Hz by default for low speed devices, 1000 Hz for full speed devices) is responsible for the second component of the end-to-end latency described above. This component may be modeled with a random variable with a uniform distribution of range, e.g., [0, 8 ms], [0, 1 ms], and so on.

Input stack processing may be modeled with a fixed (unknown) parameter. Graphics rendering $L_{GRAPHICS}$ may be modeled as a random variable with a uniform distribution of range [0, 17 ms] for 60 Hz refresh rate. Screen latency may be modeled with a fixed (unknown) parameter, usually between fifteen to thirty milliseconds.

After the breakdown, the latency equation may be rewritten in the following way:

$$L = L_{E2E} = U_{[l_{HW1}, l_{HW2}]} + U_{[0, 1_{USB}]} + f_{INPUT\ STACK} + U_{[0, 1_{GRAPHICS}]} + f_{SCREEN}$$

where U[a, b] stands for uniform distribution in range [a, b], and fc stands for fixed (but unknown) parameter describing c. Thus, latency may be modeled using the following generalized expression:

$$L = U_{[0, 1_{Hardware}]} + U_{[0, 1_{Bus}]} + f_{INPUT\ STACK} + U_{[0, 1_{GRAPHICS}]} + f_{SCREEN}$$

where U[a, b] stands for uniform distribution in range [a, b], and fc stands for a fixed parameter describing c.

Once modeled, data may be acquired and then parametric statistics methods may be used to find a "best fit" between the model and the data. In this way, a model having a relatively higher degree of accuracy may be obtained along with an ability to estimate confidence level for the fitted model.

An example measurement technique is now discussed. In this approach to data acquisition, a target rectangle rendered on the screen is moved (e.g., at constant velocity) and a user is asked to follow the rectangle, e.g., with a finger of the user's hand, using a robot, and so forth. In one or more implementations, the speed of movement of the rectangle is chosen such that a user can successfully follow the rectangle with desired accuracy, e.g., to follow a 20 cm/s moving rectangle with as low as 0.05 cm/s variation which is 0.25% variation.

To perform the test, the target rectangle is moved on the screen at a given velocity, e.g., 20 cm/s using an elliptic curve. The user is then asked to follow the rectangle using a touch input, e.g., the finger of the user's hand 108.

Touch messages are then monitored to measure average velocity and variance of speed for the cycle. Based on average velocity and variance, N (usually 3-5) out of M (total number of cycles user circled around, usually ~20) cycles are selected. The data is then analyzed to find a model that accurately represents the data. For example, the average and variance of the tracking can be used to calculate a "best fit." This analysis may be performed without modeling the presence of the finger of the user's hand 108.

Actual end-to-end latency may be calculated in the following way. For each touch message received, the distance between reported touch input coordinates and current position of the rendered rectangle is obtained. This distance may be expressed in any desired unit, e.g., centimeters. Velocity information (average and variance) was already obtained as described above. Therefore, for each sample the latency may be modeled as: $L_{E2E}=d/v$, where d is distance in [cm], v is average velocity in centimeters per second.

In one or more implementations, the finger may be modeled relative to a center of the target rectangle. For example, a two dimensional Gaussian distribution may be used to model the distance from the finger of the user's hand 108 to the center of the target rectangle displayed by the touchscreen device 104.

This distribution has an offset in both directions ($\mu_X, \mu_Y$), as well as variance ($\sigma_X, \sigma_Y$). Additionally, it may be assumed that the user may make the same kind of error (e.g., an error belonging to the same distribution) regardless of how the touchscreen device 104 is rotated with respect to the user, and regardless of the orientation of the target rectangle movement (clockwise vs. counterclockwise). For example, if the physical screen is to be rotated by π (180°), a Gaussian distribution with parameters ($\mu_X, -\mu_Y, \sigma_X, \sigma_Y$) is expected. In another example, if the screen is rotated by π/2 (90°), a Gaussian ($\mu_Y, \mu_X, \sigma_Y, \sigma_X$) is expected.

Accordingly, a compensation process may be used to increase accuracy of an estimated finger-to-target distance distribution in repeating sessions where the orientation is different or where screen is rotated. Furthermore, since the coordinates of each reported touch input are known as well as the supposed position (center of the target rectangle), this information may be used together with the compensation to perform an analysis. The results of the linearity test (as further described in the "Contact Geometry Tests" section below) are known, and hence the accuracy of the sensor (e.g., capacitive sensor) of the touchscreen device 104, this may be included in the model to increase a confidence level.

An approximation of the proposed fitting may be performed as follows. Eight sessions may be monitored at the same target velocity, e.g., a full compensation cycle which involves four clockwise and four counterclockwise sessions at twenty centimeters per second. "N" cycles may be selected from each session based on variance, e.g., three to five cycles using the same number for each of the sessions.

Each of the distances from the reported touch contact point to the current target rectangle center may then be summed. The average distance may then be estimated by dividing total distance with total number of points. Additionally, average latency may be estimated by dividing average distance by target velocity. The proposed technique results in an approximation of the average end-to-end latency in the touch pipeline.

Calculating Position of Where a Rectangle is to be Rendered

In this section, various implementation details are discussed of a latency measurement system (e.g., which may be implemented using one or more modules as described previously) that may be utilized to measure latency. The latency measure system may include an application (e.g., single window) with a message pump and a message handler, e.g., a WndProc message handler. Positions of the rectangles may be pre-computed for faster processing/rendering, with a number of rectangles chosen to provide smooth transition, such as two thousand rectangles per ellipse. On WM_PAINT, a real time counter may be used to calculate the index of the rectangle to be drawn to perform efficient rendering, e.g., at up to thirty thousand frames per second. On WM_POINTER, a real time counter may be used to calculate an index of the rectangle that ought to be drawn at that precise moment. Additionally, information about the timestamp, current target rectangle index, and touch contact position may be stored in a memory buffer for faster processing and analyzed after the acquisition is over.

In an example implementation, a relatively low overhead application is used with a single window that is displayed across the available display area of a screen, e.g., with no menus or title bar to reduce overhead, although other implementations are also contemplated. A standard message pump may also be used, e.g., Peek, Translate, and Dispatch. WndProc may also be implemented to be fairly simple, e.g., by having WM_PAINT, WM_POINTER and a few other messages such as WM_KEYDOWN to exit the app after "ESC" is pressed.

Support may be added for changing the default values of the parameters from the command line. For example, default values may be changed regarding a physical width and height of the screen, which is otherwise obtained with GetDeviceCaps( ), physical width and height of the target rectangle, target velocity, orientation (e.g., clockwise or counterclockwise), minimum number of pre-computed rectangles, and distance to the edges (both horizontal and vertical) of the screen.

As stated above, the position of the rectangles may be pre-computed to improve run-time processing. For circumference, Ramanujan's approximation may be used which is shown as follows:

$$cf = \pi[3(a+b) - \sqrt{10ab + 3(a^2+b^2)}]$$

This function may be used to pre-compute the position of equidistant rectangles on the circumference of an ellipse. To achieve this, an iterative parametric solution may be employed. It should be noted that end-to-end error of this iterative process may be less than a single pixel, e.g., a circumference of the ellipse as defined by the rectangle points is 0.1 pixels smaller than the circumference of the absolute ellipse.

The rendering process may also be configured to improve performance, below is an example code snip presenting WM_PAINT processing.

```
FillRect(memDC, &rects[previous], bbrush); // background brush
QueryPerformanceCounter((LARGE_INTEGER *) &current);
previous = (unsigned int) (((current - start) % module) >> shift);
FillRect(memDC, &rects[previous], fbrush); // foreground brush
``` where module is calculated as:

$$module = freq * cf / velocity$$

and shift is chosen to reduce the number of rectangles, e.g., to between one to two thousand. Regarding rendering, there are several rendering technologies that may be utilized, such as Direct 2D (D2D), two dimensional vector graphics (e.g., GDI+), and graphics device interface (GDI).

After both rectangles are filled (as presented in the segment of code above) BitBlt is called to transfer joint area of both rectangles to hDC (from memDC). It is worth noting that not each of the 31,000 frames are rendered at each time, but rather those that would actually change the rendered rectangle.

Finally, WM_POINTER processing may be used to store information to a memory buffer, such as the position of the touch input as reported by the digitizer of the touchscreen device 104 and current timestamp (e.g., position of the target rectangle currently being rendered on the touchscreen 106 of the touchscreen device 104). Example code that may be executed to perform this is presented below.

```
// get current timestamp
QueryPerformanceCounter((LARGE_INTEGER *) &current);
if (tic < MAX_TABLE_SIZE)
{
    // message information
    ti[tic].message = message;
    ti[tic].x = GET_X_LPARAM(lParam);
    ti[tic].y = GET_Y_LPARAM(lParam);
    ti[tic].id = GET_POINTERID_WPARAM(wParam);
    ti[tic].primary = IS_POINTER_PRIMARY_WPARAM(wParam);
    // current timestamp and rectangle id
    ti[tic].timestamp = current;
    ti[tic].rid = (unsigned int) (((current - start) % module) >> shift);
    tic++;
}
```

This information is later used to calculate the distance between the reported touch contact position and the center of the target rectangle.

Another way to measure operating system latency ($L_{OS} = L_{E2E} - L_{HW}$) is by using HID compliant device emulation. For example, a USB development board may be programmed to report "fake" HID reports, which could then be used to process and measure the processing latency. A variety of other examples are also contemplated, further discussion of which may be found in relation to the example procedures.

Contact Geometry Tests

In this section, techniques are described which relate to contact geometry tests, with may be employed to promote test repeatability. Conventionally, formal contact geometry tests were not considered primarily because it was difficult to reproduce them with accuracy. With the techniques described herein, however, each device may be tested and a variety of different centroid detection algorithms may be used. A palm rejection threshold may also be established. Further, linearity of the output (for say diagonal lines) may be measured. In this way, a better understanding may be obtained for detection of the connected components (a part of the touch processing pipeline) and accurately measure thresholds used therein. Additionally, reported contact geometry (by the HID report) may be calibrated, as contact geometry is not well calibrated in conventional touchscreen devices.

As above, this approach may be based on the grounding effect of a human finger has when touching a capacitive sensor. This is because a human body is a good capacitor with capacitance ~100 pF, compared to ~0.6 pF for an average mutual capacitance cell. Accordingly, a conductor (e.g., a piece of metal) placed between the finger and the capacitive sensor may be used to transfer the capacitance of the human body which would ultimately have the same grounding effect on the sensor. But in this case, however, the contact geometry is defined by the geometry of the conductor that is consistent, e.g., does not change regardless of an amount of pressure used and/or a number of times the conductor contacts the touchscreen device 104.

Figure 9:
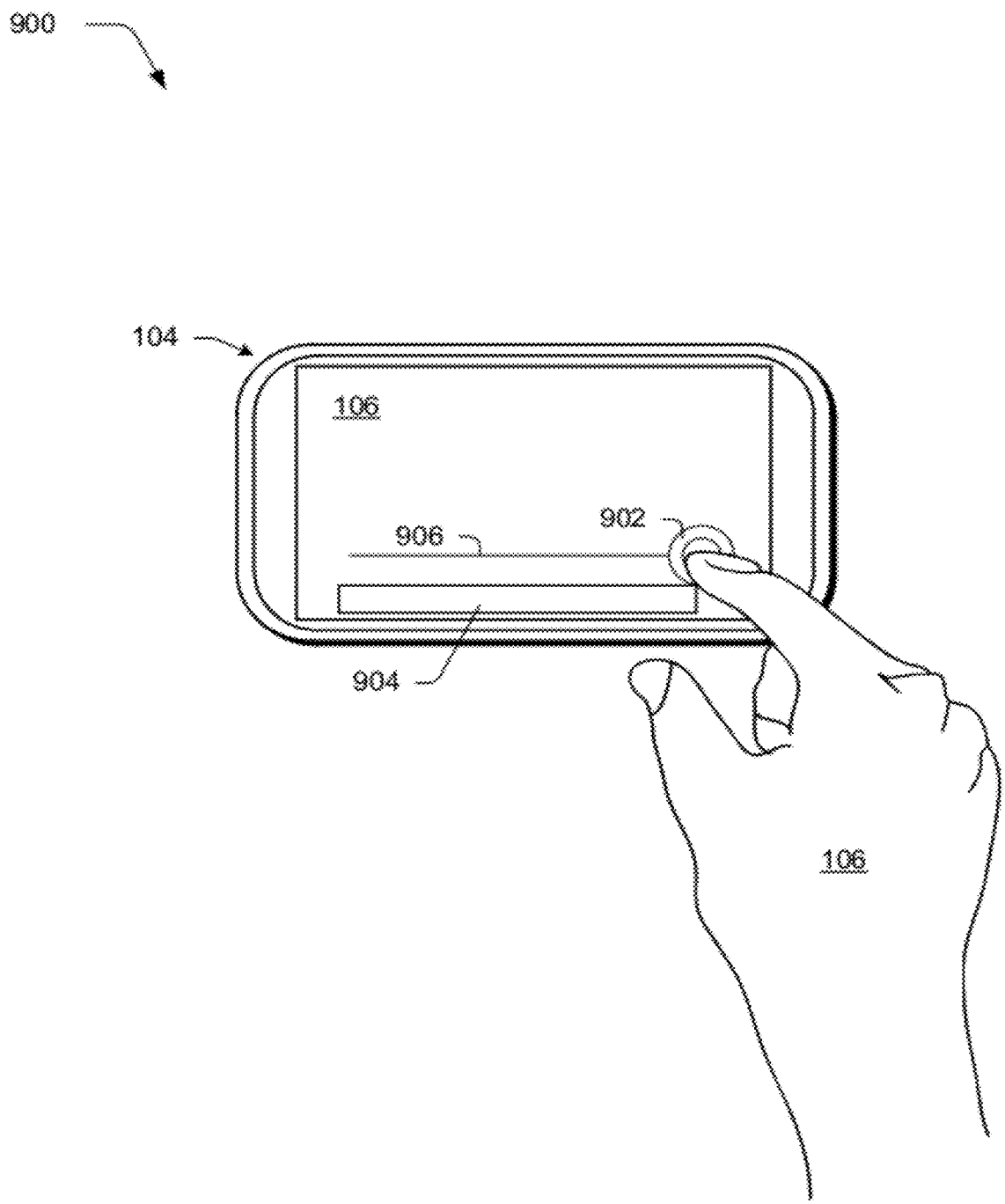
FIG. 9 is an illustrated of an example implementation showing a conductor configured as a flat washer being used to test a touchscreen of a touchscreen device.

For example, as shown in the example implementation 900 of FIG. 9, a conductor configured as a flat washer 902 may be used to test a touchscreen 106 of a touchscreen device 104. Flat washers of various sizes may be used to mimic different contact geometries, which may range in size from roughly 8.5 millimeters in diameter to 38 millimeters in this example. Thickness is roughly 1 mm for each of these in this example although other thicknesses are also contemplated. This allows both light and strong touch inputs to be tested, as well as palm rejection. It should be noted that actual touch sensor pressure (e.g., differentiation between a light and a hard touch input) corresponds to the actual contact geometry area as capacitive touch sensors do not report applied pressure and instead rely on contact geometry to determine the applied pressure.

For instance, a light touch may be modeled with a contact geometry diameter of 8.5 millimeters, while a strong touch may be modeled with a diameter of 15 millimeters. Likewise, a full thumb press would then be around 20 mm in diameter. A contact geometry having a 32 millimeter diameter will likely be rejected as over a palm threshold on most digitizers.

It is worth noting that a hole in the middle of the metal flat washers in this example may not significantly influence the result of the test, especially for the smaller diameters. Thus, conductors may also be utilized with or without holes in the middle.

The testing procedure described below involves use of a drawing program in a "brushes" mode to output a display on the touchscreen 106 to record touch input coordinates. For example, a straight edge 904 (e.g., ruler) may be fixed with tape to a touchscreen 106. A conductor (e.g., the flat washer 902) may then be moved to slide against the ruler and across a surface of the touchscreen 106. The result of this action may then be saved both using photograph of the touchscreen 106 and as a bitmap image. Both images may then be processed for comparison purposes. Further explanation may be found for each test conducted in the following discussion.

Centroid Detection

A contact geometry testing environment may be leveraged to understand differences between various hardware vendors in their interpretation of the centroid for a given contact geometry. For example, the testing system may involve placing the ruler as fixed on top of the device, sliding the metal piece by the ruler and using a drawing program to record the action as described above. For each contact geometry size, several tests (e.g., which may be drawn using different colors) may be run to establish and verify the pattern.

Contact Geometry Resolution Calibration

An observation was made that some devices do not report position and contact geometry in the same scale (which is assumed by the system), e.g., the contact geometry resolution was quite different than the position resolution. After conducting a test described further below it was realized that actual resolution for contact geometry was ~94×53 which was several orders of magnitude smaller that the resolution of position (~60000×34000).

Testing procedure involves collecting WM_INPUT data, namely width and height of the contact geometry. This calibration may be based on a realization that a change in contact geometry size may reflect in change of reported width and height, and that this change is linear (although a higher degree polynomial interpolation may be used). For example, reported geometry for various sizes may be measured against the actual physical sizes of the metal pieces used. The line may then be extrapolated towards the size of the screen to obtain resolution to avoid palm rejection. A simple linear regression function may be used.

For each individual size measurement, the conductor (e.g., metal instrument) may be moved around and the reported geometry recorded (e.g., 30-100 samples). In this way, the error of the sensor may be averaged, such as to calculate an average of the reported values, with sub-pixel accuracy if desired.

Palm Rejection Threshold

One feature of touch digitizers involves palm rejection, such that a large blob is ignored and not reported to the system. For some purposes, it might be of interest to detect a size of the blob which would get ignored, namely the palm rejection threshold. In some instance, a single size threshold is not used to qualify the blob for rejection, however the test proposed may still give some indication of the size involved for this to happen. The test may involve increasing a size of a conductor (e.g., a metal disc) until it is rejected. Additionally, several different types of geometries may also be tested having different sizes, e.g., both circular and elliptical metal pieces.

Linearity of the Digitizer

Linearity of a digitizer may also be an issue. To compensate, a constant geometry ensured by the conductor (e.g., metal disk) may be used along with a straight line ensured by the ruler to slide the conductor along the ruler. The linearity results may be used to compare devices.

Connected Components Processing

Detecting connected components is a part in the touch processing pipeline which is responsible for isolating individual blobs, which would later be sent to further processing. Consequently, in some instances when contact geometry is above a certain threshold size, the geometry may get artificially divided into two or more connected components in an unstable manner that produces jitter. Thus, a single conductor may be artificially divided into two or more connected components when above the threshold size.

A jitter of this kind is an indication of overspecializing, as it may result from an attempt to detect two (or more) touch points. The result obtained this way may originate deep from the noise level (e.g., below effective SNR line) and therefore produce this significant amount of jitter. This effect may even be exacerbated as the contact geometry increases.

Thus, a variety of different techniques have been described in the above sections. These techniques include including measuring hardware latency, touch point accuracy, contact geometry accuracy, orientation accuracy, and centroid detection. Additionally, techniques have been described to calibrate a touch sensor for touch point, contact geometry, orientation and centroid detection and efficiently acquire labeled data which can later be used in a training process for touch point, contact geometry, orientation, and centroid detection. Further, techniques have been described to measure sensitivity (e.g., with change of effective capacitance to the ground), measure ID tracking accuracy (e.g., with a number of conductors), efficiently acquire labeled data which can later be used in a training process for ID tracking, measure a palm rejection threshold, measure linearity of the digitizer (e.g. diagonal lines), measure the quality of connected components processing (e.g., establish threshold after which more than one contact is reported instead of a single contact), and detect and establish the relationship between the underlying sensor pattern and the measured raw signal (e.g., by placing a washer at the different fractional locations).

Example Procedures

The following discussion describes touchscreen testing techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the systems 200, 400 of FIGS. 2 and 4.

Figure 10:
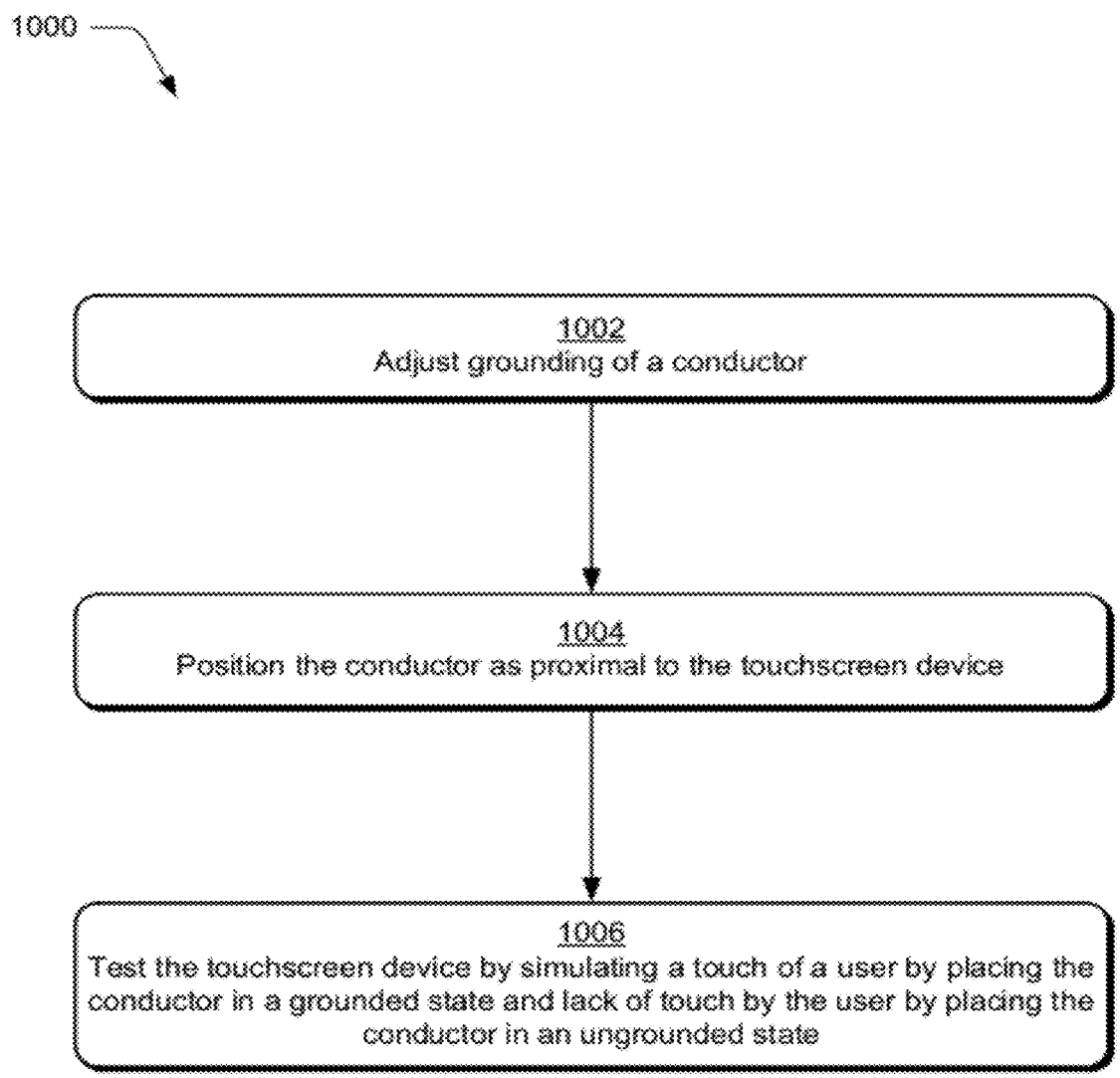
FIG. 10 is a flow diagram depicting a procedure in an example implementation in which grounding is adjusted and a touchscreen device is tested.

FIG. 10 is a flow diagram depicting a procedure 1000 in an example implementation in which grounding is adjusted and a touchscreen device is tested. Grounding of a conductor is adjusted (block 1002). For example, this technique may involve data received from digitizers of the touchscreen device 104, such as the HID report. This technique may also be performed without this data as previously described above.

The conductor is positioned proximal to the touchscreen device (block 1004). For example, the conductor may be placed within range of capacitance sensors of the touchscreen device 104, which may include contact or near contact by the conductor against digitizers of the touchscreen device 104.

The touchscreen device is tested by simulating a touch of a user by placing the conductor in a grounded state and lack of touch by the user by placing the conductor in an ungrounded state (block 1006). A switch 116, for instance, may be used to alternate between the grounded and ungrounded stated. Thus, the conductor may remain unmoving yet still used to test both touch and a lack of touch. A variety of other examples are also contemplated as previously described.

Example Device

Figure 11:
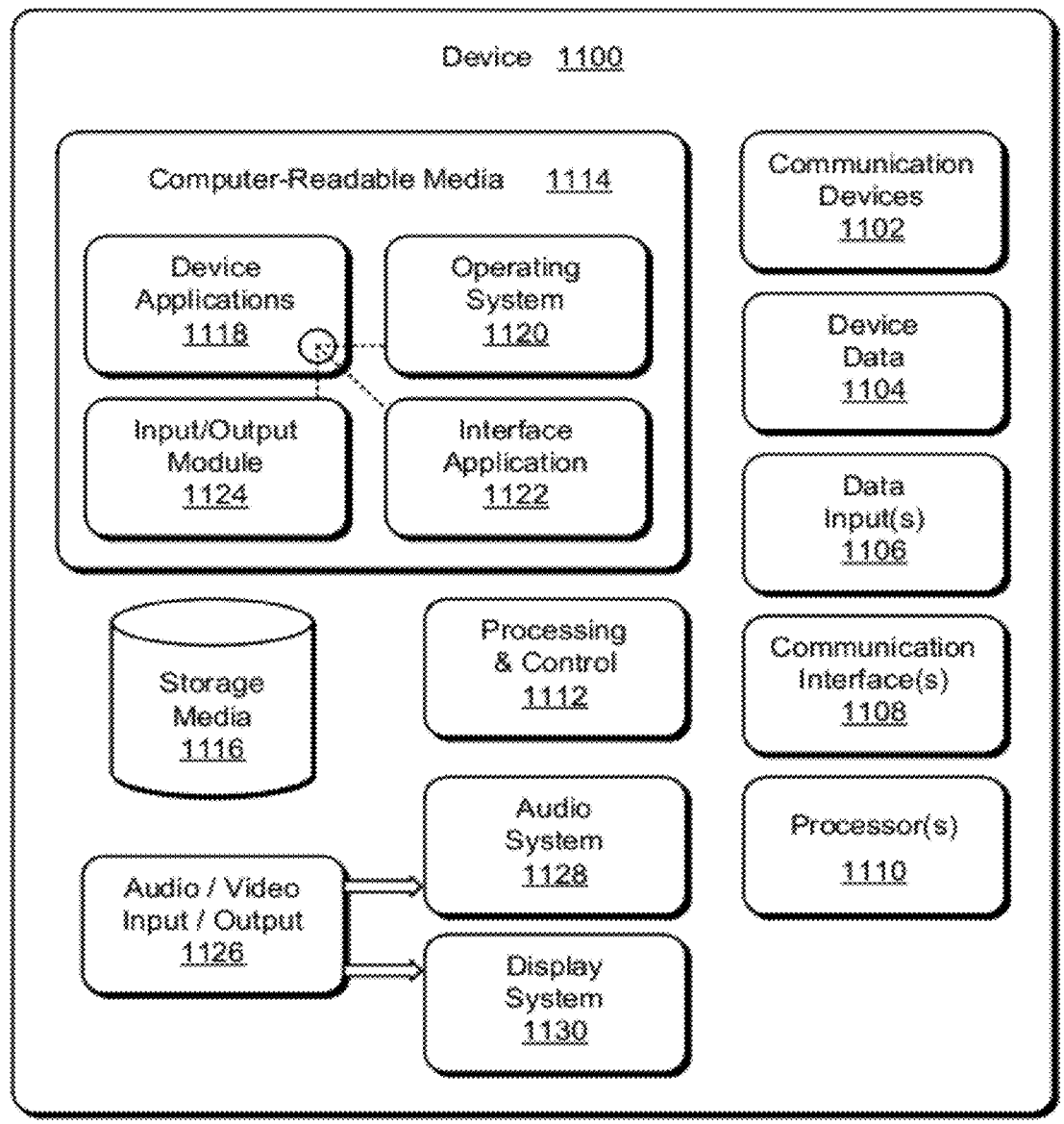
FIG. 11 illustrates various components of an example device that can be implemented as any type of computing device as described with reference to FIGS. 1 and 2 to implement embodiments of the techniques described herein.

FIG. 11 illustrates various components of an example device 1100 that can be implemented as any type of computing device as described with reference to FIGS. 1 and 2 to implement embodiments of the techniques described herein. Device 1100 includes communication devices 1102 that enable wired and/or wireless communication of device data 1104 (e.g., received data, data that is being received, data scheduled for broadcast, data packets of the data, etc.). The device data 1104 or other device content can include configuration settings of the device, media content stored on the device, and/or information associated with a user of the device. Media content stored on device 1100 can include any type of audio, video, and/or image data. Device 1100 includes one or more data inputs 1106 via which any type of data, media content, and/or inputs can be received, such as user-selectable inputs, messages, music, television media content, recorded video content, and any other type of audio, video, and/or image data received from any content and/or data source.

Device 1100 also includes communication interfaces 1108 that can be implemented as any one or more of a serial and/or parallel interface, a wireless interface, any type of network interface, a modem, and as any other type of communication interface. The communication interfaces 1108 provide a connection and/or communication links between device 1100 and a communication network by which other electronic, computing, and communication devices communicate data with device 1100.

Device 1100 includes one or more processors 1110 (e.g., any of microprocessors, controllers, and the like) which process various computer-executable instructions to control the operation of device 1100 and to implement embodiments of the techniques described herein. Alternatively or in addition, device 1100 can be implemented with any one or combination of hardware, firmware, or fixed logic circuitry that is implemented in connection with processing and control circuits which are generally identified at 1112. Although not shown, device 1100 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 1100 also includes computer-readable media 1114, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 1100 can also include a mass storage media device 1116.

Computer-readable media 1114 provides data storage mechanisms to store the device data 1104, as well as various device applications 1118 and any other types of information and/or data related to operational aspects of device 1100. For example, an operating system 1120 can be maintained as a computer application with the computer-readable media 1114 and executed on processors 1110. The device applications 1118 can include a device manager (e.g., a control application, software application, signal processing and control module, code that is native to a particular device, a hardware abstraction layer for a particular device, etc.). The device applications 1118 also include any system components or modules to implement embodiments of the techniques described herein. In this example, the device applications 1118 include an interface application 1122 and an input/output module 1124 (which may be the same or different as input/output module 114) that are shown as software modules and/or computer applications. The input/output module 1124 is representative of software that is used to provide an interface with a device configured to capture inputs, such as a touchscreen, track pad, camera, microphone, and so on. Alternatively or in addition, the interface application 1122 and the input/output module 1124 can be implemented as hardware, software, firmware, or any combination thereof. Additionally, the input/output module 1124 may be configured to support multiple input devices, such as separate devices to capture visual and audio inputs, respectively.

Device 1100 also includes an audio and/or video input-output system 1126 that provides audio data to an audio system 1128 and/or provides video data to a display system 1130. The audio system 1128 and/or the display system 1130 can include any devices that process, display, and/or otherwise render audio, video, and image data. Video signals and audio signals can be communicated from device 1100 to an audio device and/or to a display device via an RF (radio frequency) link, S-video link, composite video link, component video link, DVI (digital video interface), analog audio connection, or other similar communication link. In an embodiment, the audio system 1128 and/or the display system 1130 are implemented as external components to device 1100. Alternatively, the audio system 1128 and/or the display system 1130 are implemented as integrated components of example device 1100.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
adjusting ground of a conductor that is external to a touchscreen device effective to obtain repeatable measurements, the conductor having a defined contact geometry that is consistent;
positioning the conductor as proximal to the touchscreen device, the conductor in a non-grounded state; and
testing the defined contact geometry of the conductor contacting the touchscreen device using data generated by the touchscreen device in order to test and differentiate between a light touch input and a hard touch input, said testing comprises using an electrical switch to alternate the conductor between a grounded state to emulate a touch event and the non-grounded state to emulate a non-touch event on the touchscreen device without moving the conductor subsequent to said positioning the conductor.

2. A method as described in claim 1, wherein the testing includes centroid detection.

3. A method as described in claim 1, wherein the testing includes contact geometry resolution calibration.

4. A method as described in claim 3, wherein the contact geometry resolution calibration leverages data obtained from the touchscreen device that describes a height and width of the conductor as detected by the touchscreen device.

5. A method as described in claim 1, wherein the testing includes detecting a palm rejection threshold indicating a size of the palm rejection threshold.

6. A method as described in claim 1, wherein the testing includes determining linearity of a digitizer of the touchscreen device.

7. A method as described in claim 1, wherein the testing includes determining a threshold size at which a contact geometry of an input of a single conductor is artificially divided into two or more connected components.

8. A method as described in claim 1, wherein the conductor is not a body part.

9. A method as described in claim 1, wherein the conductor is an electrically conductive metal.

10. A method as described in claim 1, wherein the testing includes contact geometry recognition of the touchscreen device using the data generated by the touchscreen device.

11. A method comprising:
adjusting ground of a plurality of conductors that are external to a touchscreen device effective to obtain repeatable measurements, each of the conductors being an electrically conductive metal having a defined contact geometry that is consistent and having a size that is different, one to another;
positioning the plurality of conductors as proximal to the touchscreen device;
gathering data from the touchscreen device that describes the contacting of the plurality of conductors as a touch event and a non-touch event; and
testing the defined contact geometry of the conductor contacting the touchscreen device using the gathered data, in order to test and differentiate between a light touch input and a hard touch input, by using an electrical switch to alternate each of the plurality of conductors between a grounded state to emulate the touch event on the touchscreen device for each of the plurality of conductors and a non-grounded state to emulate the non-touch event on the touchscreen device for each of the plurality of conductors, said testing without moving the plurality of conductors subsequent to said positioning the plurality of conductors.

12. A method as described in claim 11, wherein the testing includes contact geometry recognition of the touchscreen device.

13. A method as described in claim 11, wherein the testing includes centroid detection.

14. A method as described in claim 11, wherein the testing includes contact geometry resolution calibration.

15. A method as described in claim 14, wherein the contact geometry resolution calibration leverages data obtained from the touchscreen device that describes a height and width of the conductor as detected by the touchscreen device.

16. A method as described in claim 11, wherein the testing includes detecting a palm rejection threshold indicating a size of the palm rejection threshold.

17. A method as described in claim 11, wherein the testing includes determining linearity of a digitizer of the touchscreen device.

18. A method as described in claim 11, wherein the testing includes determining a threshold size at which a contact geometry of an input of a single conductor is artificially divided into two or more connected components.

19. A system comprising:
a conductor implemented to adjust ground of the conductor that is external to a touchscreen device effective to obtain repeatable measurements, the conductor being an electrically conductive metal having a defined geometry that does not change with a variable amount of pressure used to contact the touchscreen device, the conductor positioned proximal to the touchscreen device and implemented to move across a surface while contacting the touchscreen device;
an electric switch configured to alternate the conductor between a grounded state and a non-grounded state; and a test module of a computing device configured to place the conductor against the touchscreen device for testing centroid detection of the touchscreen device using data generated by the touchscreen device responsive to the conductor being moved across the surface of the touchscreen device, the test module connected to the electric switch and further configured to:

communicate a command to the electric switch to place the conductor in the grounded state to emulate a touch event on the touchscreen device while the conductor is contacting the touchscreen device; and communicate another command to the electric switch to place the conductor in the non-grounded state to emulate a non-touch event on the touchscreen device while the conductor is contacting the touchscreen device.

20. A system as described in claim 19, wherein the defined geometry of the conductor having a first diameter that models a light touch input, and the system further comprising:

another conductor being an electrically conductive metal having a different geometry that does not change with a variable amount of pressure used to contact the touchscreen device, the other conductor positioned proximal to the touchscreen device and implemented to move across a surface while contacting the touchscreen device, the different geometry of the other conductor having a second diameter that models a hard touch input.

* * * * *